(12) United States Patent
Lutkenhaus et al.

(10) Patent No.: US 11,359,097 B2
(45) Date of Patent: Jun. 14, 2022

(54) CLAY BASED ANTICORROSION COATINGS AND METHODS FOR APPLYING SAME TO METAL SUBSTRATES

(71) Applicant: The Texas A&M University System, College Station, TX (US)

(72) Inventors: Jodie L. Lutkenhaus, College Station, TX (US); Pilar C. Suarez-Martinez, College Station, TX (US); Robert C. Nahas, Voorhees, NJ (US); Jerome R. Robinson, Providence, RI (US)

(73) Assignee: The Texas A&M University System, College Station, TX (US)

( * ) Notice: Subject to any disclaimer, the term of this patent is extended or adjusted under 35 U.S.C. 154(b) by 193 days.

(21) Appl. No.: 16/324,148

(22) PCT Filed: Sep. 5, 2017

(86) PCT No.: PCT/US2017/050070
§ 371 (c)(1),
(2) Date: Feb. 8, 2019

(87) PCT Pub. No.: WO2018/045370
PCT Pub. Date: Mar. 8, 2018

(65) Prior Publication Data
US 2019/0211213 A1    Jul. 11, 2019

Related U.S. Application Data

(60) Provisional application No. 62/383,196, filed on Sep. 2, 2016.

(51) Int. Cl.
*C09D 5/08* (2006.01)
*C08K 3/34* (2006.01)

(52) U.S. Cl.
CPC ............... *C09D 5/084* (2013.01); *C08K 3/34* (2013.01); *C08K 3/346* (2013.01); *C08K 2201/005* (2013.01)

(58) Field of Classification Search
CPC .................................................. C09D 5/084
See application file for complete search history.

(56) References Cited

U.S. PATENT DOCUMENTS

| 5,552,469 A | * | 9/1996 | Beall ................ C01B 33/44 501/4 |
| 10,002,983 B1 | * | 6/2018 | Spoerke ............... C08L 33/02 |
| 2003/0027011 A1 | | 2/2003 | Kotov et al. |
| 2010/0010119 A1 | | 1/2010 | Zaarei et al. |
| 2010/0062202 A1 | | 3/2010 | Procida |
| 2010/0119796 A1 | | 5/2010 | Lam et al. |
| 2011/0288224 A1 | | 11/2011 | Gimenez et al. |
| 2013/0244024 A1 | | 9/2013 | Huffer et al. |
| 2014/0228967 A1 | | 8/2014 | Wittchow |
| 2014/0363579 A1 | | 12/2014 | Grunlan et al. |
| 2016/0030977 A1 | * | 2/2016 | Grunlan .............. C09D 179/02 428/323 |
| 2017/0088697 A1 | | 3/2017 | Clare et al. |

OTHER PUBLICATIONS

PCT/US2017/050070 International Search Report and Written Opinion dated Nov. 16, 2017 (15 p.).
Suarez-Martinez, Pilar C., et al., "Spray-On Polymer-Clay Multilayers as a Superior Anticorrosion Metal Pretreatment," Macromolecular Materials and Engineering, vol. 302, Issue 6, Mar. 27, 2017, pp. 1-8 (8 p.).
Yeh, Jui-Ming, et al., "Enhancement of Corrosion Protection Effect of Poly(o-ethoxyaniline) via the Formation of Poly (o-ethoxyaniline)-clay Nanocomposite Materials," Polymer, vol. 43, Issue 9 (Apr. 2002), pp. 2729-2736 (8 p.).
Westscott, Sarah L., let al., "Corrosion Protection by Multifunctional Stratified Coatings," NSTI—Nanotech, vol. 3, 2004, ISBN 0-9728422-9-2, pp. 288-291 (4 p.).

* cited by examiner

*Primary Examiner* — Nickey Nerangis
(74) *Attorney, Agent, or Firm* — Conley Rose, P.C.

(57) ABSTRACT

A coating for protecting a substrate from corrosion includes a first layer having a first composition applied on the substrate. The coating has a thickness of at least 0.5 μm. The first composition includes an intercalated mixture of a polymer and a clay according to a formula of $(P_x/C_{1-x})_v$, where v comprises a volume of the intercalated mixture applied to the substrate.

13 Claims, 15 Drawing Sheets

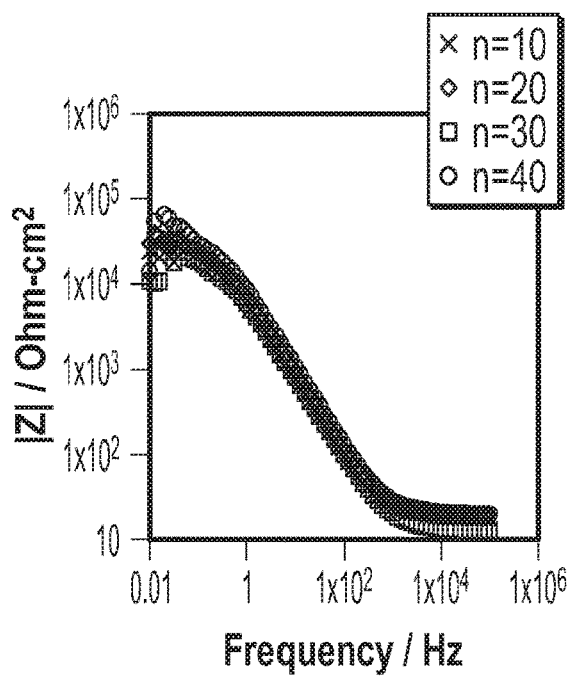
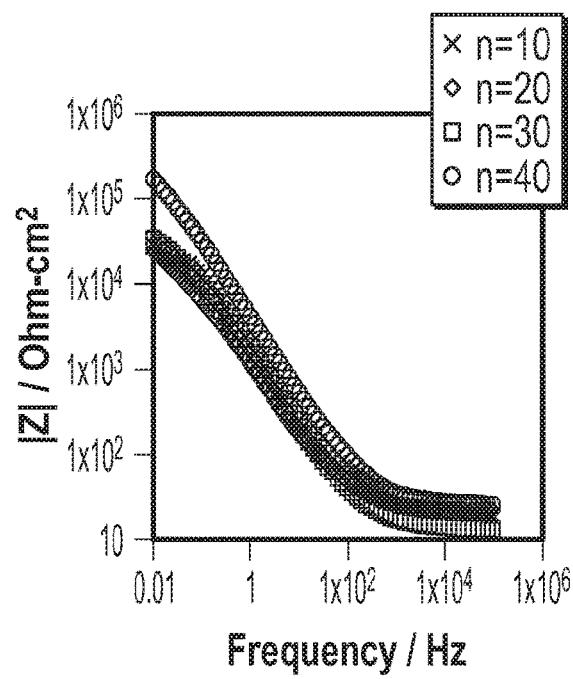
FIG. 11A
FIG. 11B
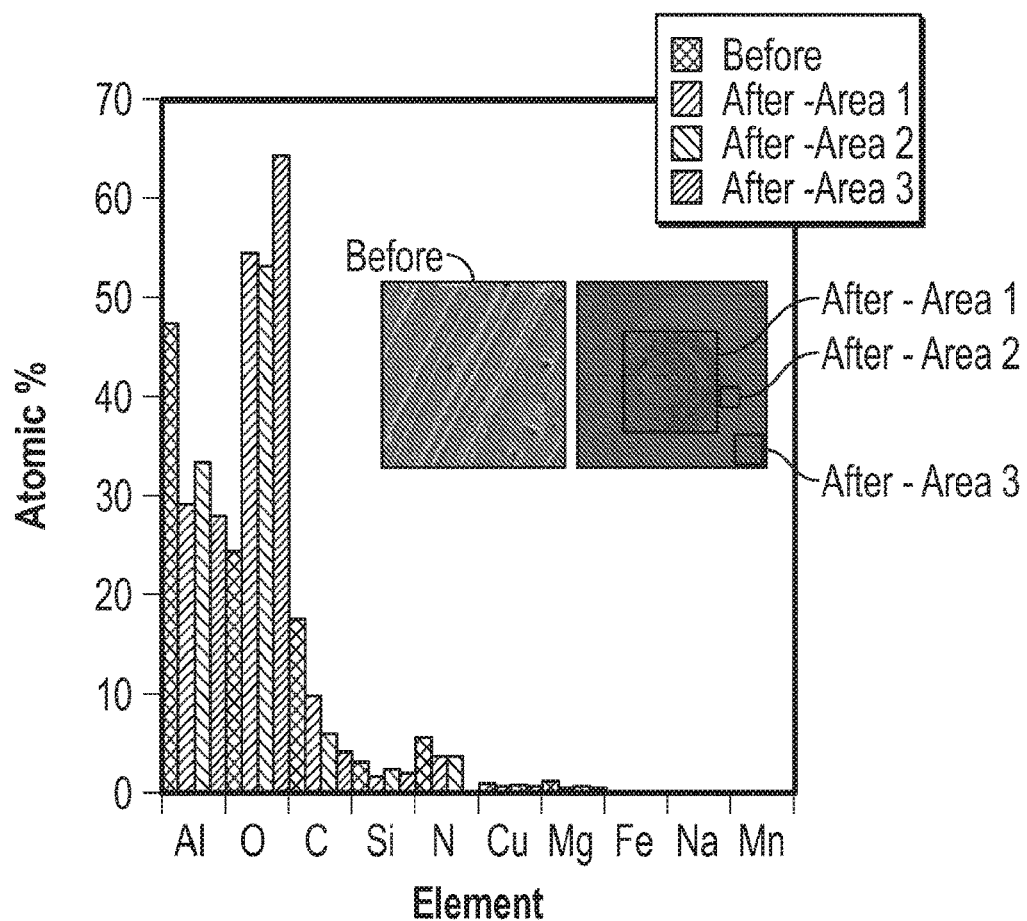
FIG. 12

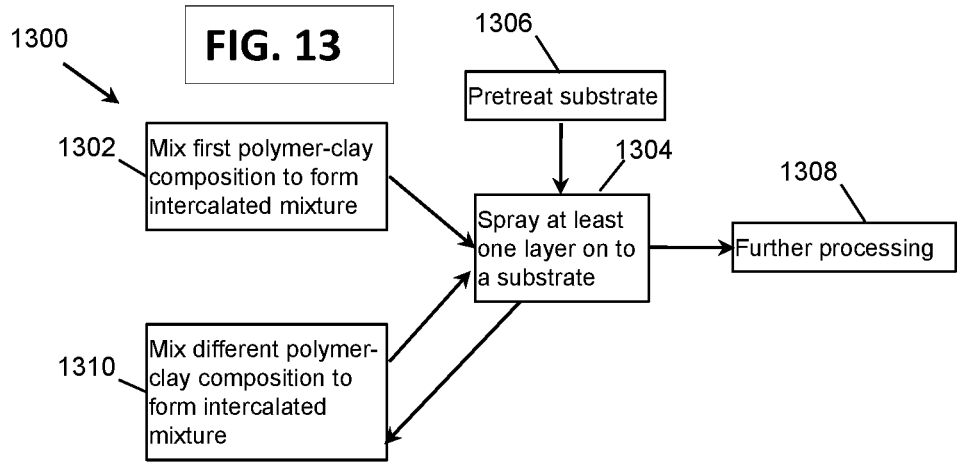
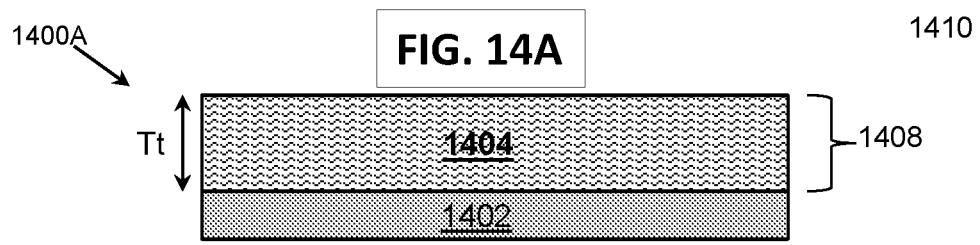
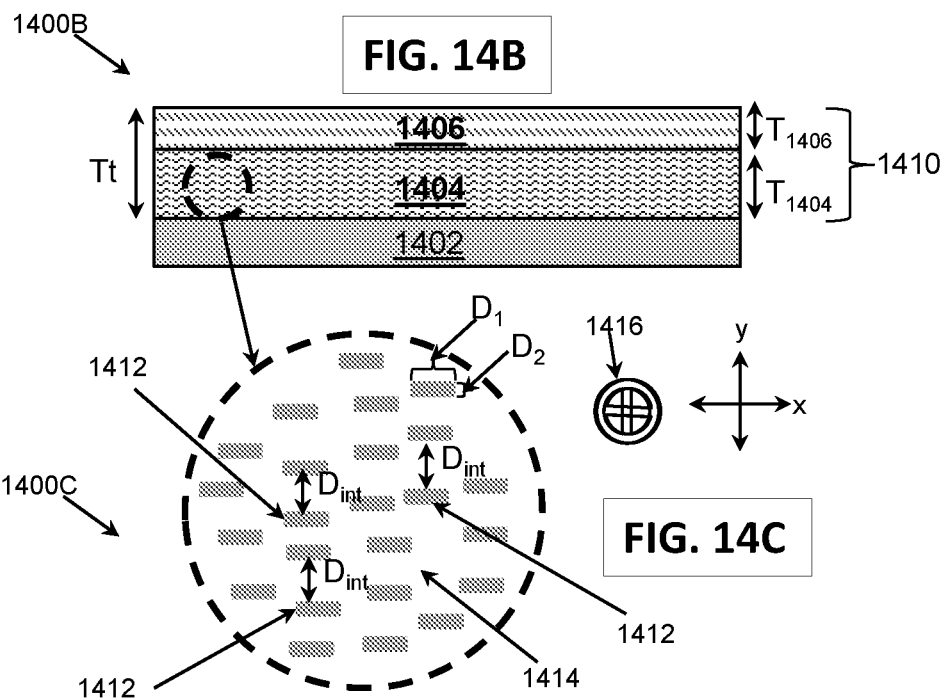

CLAY BASED ANTICORROSION COATINGS AND METHODS FOR APPLYING SAME TO METAL SUBSTRATES

CROSS-REFERENCE TO RELATED APPLICATIONS

This application is a 35 U.S.C. § 371 national stage application of PCT/US2017/050070 filed Sep. 5, 2017 and entitled "Clay Based Anticorrosion Coatings and Methods for Applying Same to Metal Substrates," which claims priority to U.S. Application No. 62/383,196 filed Sep. 2, 2016, and entitled "Clay Based Anticorrosion Coatings and Methods for Applying Same to Metal Substrates," each of which is hereby incorporated herein by reference in its entirety for all purposes.

STATEMENT REGARDING FEDERALLY SPONSORED RESEARCH OR DEVELOPMENT

Not applicable.

BACKGROUND

The disclosure relates generally to anticorrosion coatings for metal substrates. More particularly, the disclosure relates to compositions for anticorrosion coatings and methods for applying anticorrosion coatings to metal substrates.

Metals can be found everywhere in the world, in houses, buildings, bridges, automobiles, trains, planes, ships, pipe lines, storage tanks, and electronics, among others. Metals are susceptible to corrosion, which may represent a threat to human life and safety, environmental contamination, and financial loses for companies such as automobile and oil and gas. When metals are extracted and exposed to the environment they have a preference to go back to their most thermodynamically stable state. Therefore oxide layers start forming on their surface. When the oxides layers are thick enough and have good adhesion to the metal, this layer passivates the metal. However, when the oxide layers are porous and do not adhere to the metal, the corrosion process activates, and natural corrosion can be an expensive and time-consuming process. Time and resources are being invested to find new materials and ways to prevent or hinder corrosion that are economical and environmentally friendly.

BRIEF SUMMARY OF THE DISCLOSURE

In an embodiment, a coating for protecting a substrate from corrosion, the coating comprising: a first layer having a first composition applied on the substrate, wherein the coating has a thickness of at least 0.5 μm; wherein the first composition comprises an intercalated mixture of a polymer and a clay according to a formula of $(P_x/C_{1-x})_v$, wherein v comprises a volume of the intercalated mixture applied to the substrate, wherein the polymer comprises one of poly-ethylenimine (B-PEI), linear polyethylenimine (L-PEI), poly(diallyldimethylammonium chloride) (polyDDA), poly(allylamine hydrochloride), or combinations thereof or poly(acrylic acid) (PAA), poly(methacrylic acid) (PMAA), poly(styrene sulfonate) (PSS), PAAMPSA (poly(2-acrylamido-2-methylpropane sulfonic acid). In this example, the clay comprises montmorillonite (MMT), organo-modified MMT, laponite, vermiculite, kaolinite, illite, chlorite, or talc. Further in this example, the clay comprises a sheet silicate and an interlayer spacing of a plurality of clay platelets of the clay is from about 0.50 nm to about 10 nm, and an average first dimension of the plurality of platelets is from about 15 nm to about 3000 nm and an average second dimension of the plurality of platelets is from about 0.25 nm to about 3 nm. Furthermore in this example, v is a number of ml of the first composition used to form the coating and is from 1 to 10 and x is from 0.1 to 0.5, and a root mean square roughness of the coating may be from about 1% to about 20% of the coating (pretreatment) thickness.

In an embodiment, a method of coating a substrate, comprising: forming a pre-treatment coating comprising at least two layers by depositing a first composition on the substrate to form a first layer on the substrate, wherein the first layer has a thickness of at least 0.5 μm thick; wherein the first composition comprises an intercalated mixture of a first polymer and a first clay according to a formula of $(P_x/C_{1-x})_v$, wherein x is from 0.1 to 0.5 and v is a volume of the first composition deposited, and wherein a total thickness of the pretreatment is at least 2 μm. In an embodiment, the depositing comprises airbrushing and wherein v is from about 1 ml to about 10 ml, and, in some examples, prior to depositing the first composition on the substrate, forming the first composition by intercalating the first clay with the first polymer to form an average interlayer spacing of a plurality of platelets of the clay from about 0.50 nm to about 10 nm. In one example, the forming of the pretreatment further comprises: depositing a second composition on the first layer to form a second layer, wherein the second composition comprises an intercalated mixture of a second polymer and a second clay according to a formula of $(P_x/C_{1-x})_v$, wherein x is from 0.1 to 0.5 and v is a volume of the second composition deposited; wherein at least one of: the second clay is different from the first clay, the second polymer is different from the first polymer, the "x" of the second composition is different from the "x" of the first composition, the "v" of the first composition is different from the "v" of the first composition, an interlayer spacing of the first layer is different than an interlayer spacing of the second layer, or a thickness of the first layer is different than a thickness of the second layer. In an embodiment, the method further comprises maintaining the substrate at a temperature from between 50° C. and 90° C. during the depositing of the first composition and, in some examples, prior to depositing the first composition on the substrate, the method further comprises increasing a surface roughness of the substrate.

In an alternate embodiment, a coating for protecting a metal substrate from corrosion, the coating comprising: a first composition applied directly on the metal substrate to form a first layer on the metal substrate, wherein the first layer has a thickness of at least 1.0 μm and comprises an intercalated mixture of a polymer and a clay according to a formula of $(P_x/C_{1-x})_v$, wherein x is from 0.1 to 0.5, wherein the polymer comprises one of polyethylenimine (B-PEI), linear polyethylenimine (L-PEI), poly(diallyldimethylammonium chloride) (polyDDA), poly(allylamine hydrochloride), or combinations thereof or poly(acrylic acid) (PAA), poly(methacrylic acid) (PMAA), poly(styrene sulfonate) (PSS), PAAMPSA (poly(2-acrylamido-2-methylpropane sulfonic acid), and wherein the clay comprises a sheet silicate. In an embodiment, an interlayer spacing of a plurality of clay platelets of the clay is from about 0.50 nm to about 10 nm. In an embodiment of the coating, v is a number of ml of the first composition used to form the coating and is from 1 to 10, in one example, x is 0.2 and v is at least 3 ml. Further to this embodiment, the coating comprises an average first dimension of the plurality of platelets is from about 15 nm to about 3000 nm and an average second dimension of the plurality of platelets is from about 0.25 nm to about 3 nm.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIGS. 11A and 11B are Bode plots illustrating changes for various numbers of bilayers (n) for (LPEI/PAA)$_2$/(BPEI/MMT)$_n$ layer-by-layer coatings applied to AL2024 in accordance with certain embodiments of the present disclosure at day 1 (FIG. 11A) and day 40 (FIG. 11B) of immersion in NaCl 5 wt %;

FIG. 12 illustrates chemical compositions calculated using EDS for aluminum panels coated with a (LPEI/PAA)$_2$/(BPEI/MMT)$_{40}$ layer-by-layer coating in accordance with certain embodiments of the present disclosure before and after corrosion tests (EIS);

FIG. 13 is a flow chart of an embodiment method of fabricating a pretreatment coating according to certain embodiments of the present disclosure;

FIGS. 14A-14C are schematic illustrations of embodiments of pretreatment coatings formed via embodiments of the method of FIG. 13;

DETAILED DESCRIPTION OF THE PREFERRED EMBODIMENTS

Figure 1:
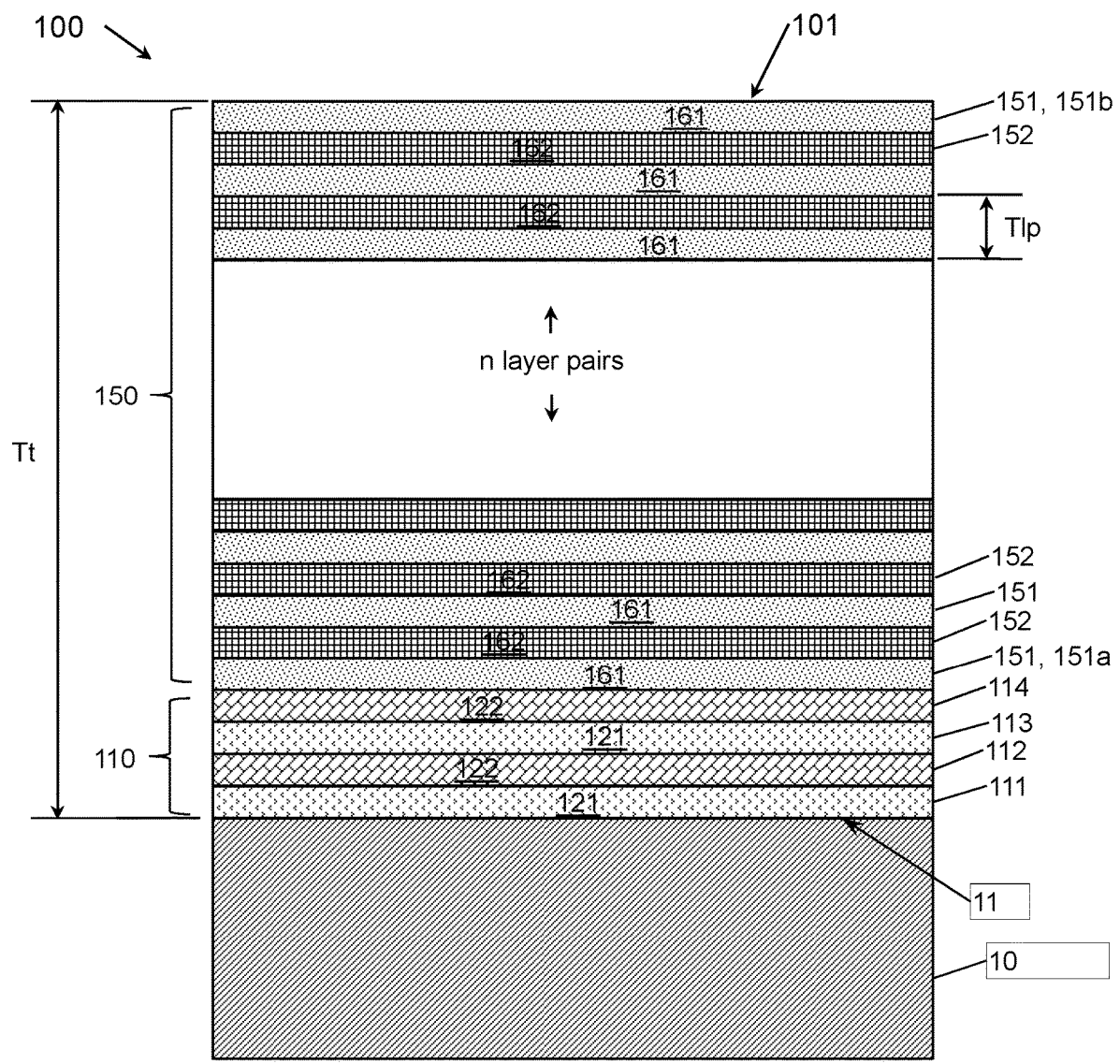
FIG. 1 is a schematic cross-sectional view of an embodiment of an anticorrosion coating in accordance with the principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to an axis (e.g., central axis of a body or a port), while the terms "radial" and "radially" generally mean perpendicular to the axis. For instance, an axial distance refers to a distance measured along or parallel to the central axis, and a radial distance means a distance measured perpendicular to the central axis.

Coatings may be used to prevent corrosion on a variety of surfaces in equipment used for subsea, terrestrial, and extraterrestrial applications. Coatings may be composed of several layers including a surface pretreatment ("pretreatment"), primer, undercoat, and topcoat layers. Each coating layer serves at least one purpose such as corrosion resistance, aesthetics (color and appearance), UV protection, and mechanical properties. In particular, the surface pretreatment layer may serve an anti-corrosion role in the coating system, thus enhancing the coating's corrosion protection. Chromium conversion coating (CCC) acts as a multifunctional smart coating, for which it is both an insoluble inhibiting barrier as well as a self-healing coating. CCCs performance has been outweighed by many environmental and safety concerns regarding its use, resulting in strict regulation of CCCs use and a pressing search for CCC substitutes. The pretreatments discussed herein are environment-friendly over periods of extended use/exposure, are cost-effective, industrially scalable, and provide equal or better corrosion resistance than CCCs and other conventionally employed pretreatments. Chromium-free coatings may present several challenges. For instance, pretreatments containing heavy metals represent a potential long term pollutant; pretreatments employing rare earth metals involve high costs; others such as sol-gels require complex and time-consuming synthesis processes; or some pretreatments' corrosion resistance don't pair with CCCs.

Polymer-clay nanocomposites (PCNs) are chromium-free and exhibit outstanding barrier characteristics which correlate to good anticorrosion properties. Intercalated PCNs with high clay content and a highly oriented structure promote effective gas barrier properties. Intercalation is a process by which a second material such as a polymer or polymers discussed herein is inserted into a nanoscale interlayer gallery of clay, such that the inserted second material is surrounded by the sheet-like clay particles. As discussed in examples herein, intercalation may occur in various ways, including the one-pot mixing process. Intercalcated PCNs may be fabricated in various ways, including in situ template synthesis, in situ intercalative polymerization, melt intercalation, layer-by-layer (LbL) assembly and solution intercalation (exfoliation-adsorption). For a versatile and scalable surface pretreatment coating, it is desirable to reduce coating application time and its associated costs, but many of these methods exhibit significant disadvantages. In situ template synthesis may result in platelet aggregation, and the high temperatures required to synthesize the clay minerals may induce polymer degradation. In situ intercalative polymerization requires modified monomers to intercalate between clay platelets, limiting monomer choice. Melt intercalation involves heat to achieve polymer intercalation into the clay platelets, and performs best with organomodified clays.

Pre-treatment coatings can be applied to bare metals to enhance corrosion resistance as well as allowed improved adhesion of subsequent layers or coatings such as paint. Hexavalent chromium is often employed as a corrosion resistant pre-treatment coating for metals and metal alloy such as aluminum. However, hexavalent chromium pretreatment coatings are considered carcinogenic and have negative environmental implications in the manufacturing and application processes. Thus, environmentally friendly, chromate-free anticorrosion pretreatment coatings are particularly desirable, provided that such pre-treatment coatings are scalable from both a manufacturability and an application perspective, and further, provide a corrosion resistance that is comparable to or exceeds the performance of the hexavalent chromium pretreatment coatings.

Discussed herein are embodiments of chromium-free polymer-clay nanocomposite systems for the fabrication of thin coatings (nano-meter scale) employed for improvement in corrosion inhibition (i.e., polymer-clay nanocomposite pretreatment coatings). Such polymer-clay nanocomposite systems offer the potential for an environmentally friendly, metal-free, non-toxic corrosion resistant pretreatment coatings. As will be described in more detail below, such thin coatings can be formed via two techniques, (1) spray-assisted layer-by-layer (LbL) assembly, and (2) airbrushing of a homogenous mixture (one-pot mixture). The LbL deposition technique comprises water-based adsorption of alternating layers of positively charged polymers and negatively charged clay from solution onto a metal substrate (e.g., aluminum alloy 2024T3). The airbrushing technique comprises a water-based deposition of a homogenous polymer-clay one-pot mixture onto a metal substrate. Commercialization of the coating(s) discussed herein enables the application of the coating to be applied on large metal substrates (e.g., it can be commercially scaled) for corrosion protection. The availability and cost of raw materials (polymers and clay), the waste, as well as the low impact of production on the environment, enable this scaled manufacturing. In addition, the products to which these coatings are applied may also have their life spans increased which reduces environmental and safety issues such as oil spills, infrastructure collapse, residential structure collapse, airplane maintenance, and health issues caused by corrosion. In addition, original equipment manufacturers (OEMs) that employ these coatings may see longer lifespans of the coated products, which improves the environmental impact when previously coated components are re-coated or scrapped.

In some examples discussed herein, the pretreatment is an airbrushed coating comprising a water-based, one-pot, spray-on surface pretreatment prepared by simply mixing a polymer such as branched polyethylenimine (BPEI) and a clay such as montmorillonite (MMT). As discussed herein, a "one-pot" composition is a composition fabricated using a single vessel such that it is applied directly to a substrate after formation. In one example, if an intercalated composition is desired, it is formed in the pot and does not undergo additional processing prior to being applied to a substrate. In other examples, other polymers such as linear polyethylenimine (LPEI), poly(diallyldimethylammonium chloride)

(polyDDA), poly(allylamine hydrochloride), or combinations thereof or poly(acrylic acid) (PAA), poly(methacrylic acid) (PMAA), poly(styrene sulfonate) (PSS), PAAMPSA (poly(2-acrylamido-2-methylpropane sulfonic acid) may be used alone or in combination with other polymers. Additional clays that may be employed in combination with these polymers may comprise montmorillonite (MMT), organo-modified MMT, laponite, vermiculite, kaolinite, illite, chlorite, talc, and other silicates with a sheet-like geometry (e.g., sheet silicates) may be employed. In some embodiments discussed herein, BPEI and MMT were mixed in a solution intercalation process, enabling precise control of the polymer-clay ratio. The structure and morphology of the sprayed coating on aluminum alloy was investigated, as well as the long-term corrosion performance. The composition was varied so as to understand structure-property-performance relationships.

Layer-by-Layer Pre-Treatment Coating

Referring now to FIG. 1, an embodiment of a coating 100 applied to a bare metal substrate 10 is shown. Coating 100 is a coating applied to an outer surface 11 of metal substrate 10 to protect metal substrate 10 from corrosion. Accordingly, coating 100 may also be referred to herein as an "anticorrosion" coating or a "corrosion resistant" pretreatment coating. In general, metal substrate 10 can be any metal or metal alloy for which enhanced corrosion resistance is desired. However, embodiments described herein may be particularly suited for use with aluminum and aluminum alloy components and parts. As shown in FIG. 1, coating 100 is directly applied to the outer surface 11 of metal substrate 10 and has a total thickness Tt measured perpendicularly from outer surface 11 of metal substrate 10 to the outermost surface 101 of coating 100. In this embodiment, the total thickness Tt is preferably at least 400 nm. In this embodiment, coating 100 includes a first composition 110 disposed directly on outer surface 11 and a second composition 150 disposed on first composition 110. Thus, the first composition 110 is positioned or sandwiched between outer surface 11 of metal substrate 10 and second composition 150.

Referring still to FIG. 1, in this embodiment, first composition 110 includes a plurality of alternating layers of positively and negatively charged polymers. In particular, first composition 110 includes a first layer 111 of cationic polymers 121 directly engaging surface 11, a second layer 112 of anionic polymers 122 disposed on first layer 111, a third layer 113 of cationic polymers 121 disposed on second layer 112, and a fourth layer 114 of anionic polymers 122 disposed on third layer 113. Thus, first layer 111 is positioned between second layer 112 and surface 11, second layer 112 is positioned between layers 111, 113, third layer 113 is positioned between layers 112, 114, and fourth layer 114 is positioned between third layer 113 and second composition 150. Layer 114 defines the outermost layer (relative to substrate 10) of first composition 110. In FIG. 1, four alternating layers 111, 112, 113, 114 are provided. In other words, first composition 110 includes two layer pairs of cationic polymers 121 and anionic polymers 122. The cationic polymers 121 in each layer 111, 113 are preferably selected from linear polyethylenimine (LPEI), branched polyethylenimine (BPEI), poly(diallyldimethylammonium chloride) (polyDDA), poly(allylamine hydrochloride), or combinations thereof; and more preferably comprise LPEI. The anionic polymers 122 in each layer 112, 114 are preferably selected from poly(acrylic acid) (PAA), poly(methacrylic acid) (PMAA), poly(styrene sulfonate) (PSS), PAAMPSA (poly(2-acrylamido-2-methylpropane sulfonic acid), or combinations thereof; and more preferably comprise PAA.

Referring still to FIG. 1, in this embodiment, second composition 150 includes a plurality of alternating layers of positively charged polymers and negatively charged silicate clay. In particular, second composition includes alternating layers 151, 152 of cationic polymers 161 and anionic silicate clay 162, respectively. The innermost layer and outermost layer of second composition 150 (relative to substrate 10), labeled 151a, 151b in FIG. 1, respectively, comprise positively charged polymers 161. The positively charged polymers 161 in each layer 151 of the second composition 150 is preferably selected from branched polyethylenimine (BPEI), linear polyethylenimine (LPEI), poly(diallyldimethylammonium chloride) (polyDDA), poly(allylamine hydrochloride), or combinations thereof, and more preferably BPEI. The negatively charged silicate clay 162 in each layers 152 of the second composition 150 is preferably selected from montmorillonite (MMT), organo-modified MMT, laponite, vermiculite, or combinations thereof, and more preferably MMT. Although innermost layer 151a and outermost layer 151b of second composition 150 comprise positively charged polymers 161 in the embodiment shown in FIG. 1, in other embodiments, the inner most layer of the second composition (e.g., layer 151a of second composition 150) comprises positively charged polymers 161 while the outermost layer of the second composition (e.g., layer 151b of second composition 150) comprises negatively charged silicate clay 162. As shown in FIG. 1, each pair of adjacent layers 151, 152 has a layer pair thickness Tlp measured perpendicular to the outer surface 11 of the metal substrate 10. In embodiments disclosed herein, the layer pair thickness Tlp of each pair of adjacent layers 151, 152 is preferably between about 1.0 to 10.5 nm.

Figure 2:
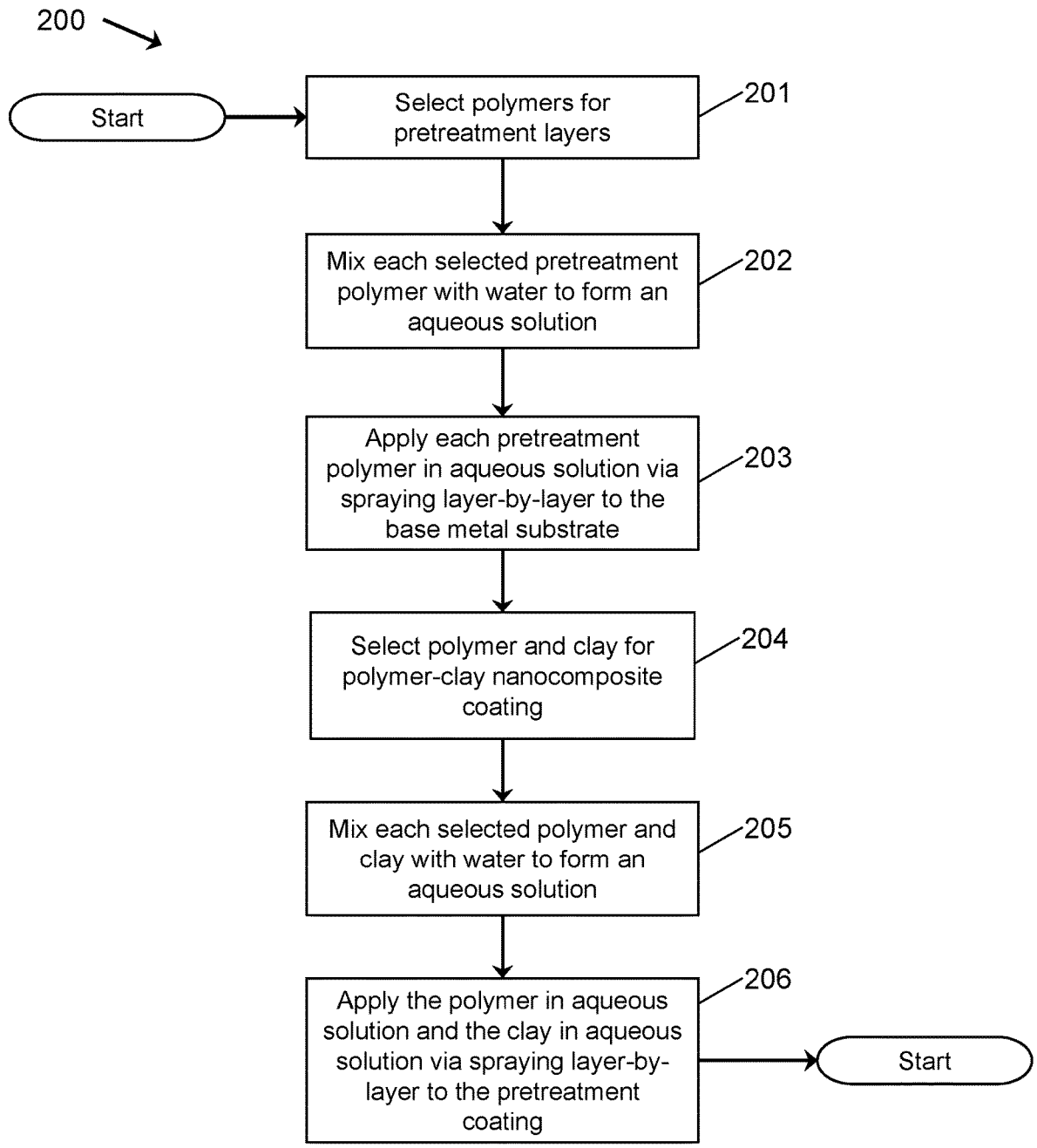
FIG. 2 is a flowchart illustrating an embodiment of a method for applying the anticorrosion coating of FIG. 1.

Referring now to FIG. 2, a flow chart illustrating an embodiment of a method 200 for applying pretreatment coating 100 to substrate 10 is shown. Beginning at block 201 of the method 200, the positively charged polymer 121 for use in layers 111, 113 of first composition 110, and the negatively charged polymer 122 for use in layers 112, 114 of first composition 110 are selected. In block 202, a first aqueous solution is formed with the polymer 121 selected at block 201 and a second aqueous solution is formed with the polymer 122 selected at block 201. In other words, at block 202, each pretreatment polymer 121, 122 selected at block 201 is mixed with water to form an aqueous solution. In embodiments described herein, the aqueous solution comprising the selected positively charged polymers 121 (e.g., LPEI) is formed by mixing the positively charged polymers 121 with Milli-Q® H$_2$O or deionized water. The resulting aqueous solution preferably has a concentration of positively charged polymers 121 of 5-20 mM (0.022-0.086 wt. %), and a pH of about 4.0 to 5.0. It should be appreciated that NaOH and HCl can be added to adjust the pH of the aqueous solution to achieve the desired pH. Similarly, in embodiments described herein, the aqueous solution comprising the selected negatively charged polymers 122 (e.g., PAA) is formed by mixing the negatively charged polymers 122 with Milli-Q® H$_2$O or deionized water. The resulting aqueous solution preferably has a concentration of negatively charged polymers of 5-20 mM (0.036-0.144 wt. %), and a pH of about 4.0 to 5.0. It should be appreciated that NaOH and HCl can be added to adjust the pH of the aqueous solution to achieve the desired pH.

Referring again to FIG. 2, and moving to block 203, the aqueous solution of polymer 121 and the aqueous solution of polymer 122 are sprayed in an alternating fashion onto substrate 10 via a layer-by-layer (LbL) process. More specifically, when the pretreatment polymers 111, 112, 113, 114 are applied to substrate 10 at block 203, the aqueous solutions comprising the selected polymers 121, 122 are applied in an alternating fashion such that layer 111 comprising a positively charged polymer 121 is disposed on the substrate 10 and then layer 112 comprising a negatively charged polymer 122 is disposed on the layer 111 comprising the positively charged polymer 121. In this embodiment, the aqueous solution of polymer 121 and the aqueous solution of polymer 122 are preferably sprayed at block 203 using an air pressure of about 25.0 psig to 30.0 psig. It is to be understood that the actual air pressure may be adjusted in various embodiments depending upon the type of solution being applied and the distance between the spray nozzle and the target. In some embodiments, an intermediate rinsing step is performed between the application of each layer 111, 112, 113, 114 of charged polymers 121, 122 at block 203. In such embodiments, the intermediate rinsing step is preferably performed for about 10 seconds using water purified by Milli-Q® system(s) available from EMD Millipore Corp. of Billerica, Mass. (referred to herein as "Milli-Q® $H_2O$") and having a pH of about 4.0. At block 204, the polymer 161 and the clay 162 are selected to use as layer 151, 152, respectively, of second composition 150. At block 205, the polymer 161 for use in layers 151 of second composition 150, and the clay 162 for use in layers 152 of second composition 150 are selected. In block 205, a first aqueous solution is formed with the clay 162 selected at block 204 and a second aqueous solution is formed with the polymer 161 selected at block 204. In other words, at block 204, polymer 161 selected at block 204 is mixed with water to form an aqueous solution, and clay 162 selected at block 204 is mixed with water to form an aqueous solution.

In embodiments described herein, the aqueous solution comprising the selected polymer 161 (e.g., B-PEI) is formed by mixing the positively charged polymer 161 with, for example, Milli-Q® $H_2O$, water having a resistivity of about 18.2MΩcm, or deionized water. The resulting aqueous solution preferably has a concentration of positively charged polymers 161 of 0.05 to 1.0 wt. %, and a pH of about 7.0 to 10.0. It should be appreciated that NaOH and HCl can be added to adjust the pH of the aqueous solution to achieve the desired pH. Similarly, in embodiments described herein, the aqueous solution comprising the selected negatively charged clay 162 (e.g., MMT) is formed by mixing the negatively charged clay 162 with Milli-Q® $H_2O$ or deionized water. The resulting aqueous solution preferably has a concentration of negatively charged clay 162 of 0.05 to 2.0 wt %, and a pH of about 4.0 to 10.0. It should be appreciated that NaOH and HCl can be added to adjust the pH of the aqueous solution to achieve the desired pH.

Referring still to FIG. 2 and moving to block 206, the aqueous solution of polymer 161 and the aqueous solution of clay 162 are sprayed in an alternating fashion onto first composition 110 via a layer-by-layer (LbL) process. In this embodiment, the aqueous solution of polymer 161 and the aqueous solution of clay 162 are preferably sprayed at block 206 using an air pressure of about 25.0 psig to 30.0 psig. It is to be understood that the actual air pressure may be adjusted in various embodiments depending upon the type of solution being applied and the distance between the spray nozzle and the target.

In some embodiments, an intermediate rinsing step is performed between the application of each layer 151, 152 of charged polymer 161 and clay 162 at block 206. In such embodiments, the intermediate rinsing step is preferably performed for about 10 seconds using Milli-Q® $H_2O$ with a pH of about 4.0. In addition, in some embodiments, an intermediate drying step is performed after deposition of each layer 151, 152. In general, drying of each layer 151, 152 can be performed by simply allowing each layer to air dry, by application of pressurized air, by exposing the layer to a gentle elevated temperature (e.g., 90° C.), or combinations thereof. In embodiments relying on air drying, each layer 151, 152 is preferably allowed to air dry for about 60 seconds before the subsequent layer 151, 152 is applied. It should be appreciated that rinsing between the application of each layer 151, 152 can be performed without subsequent drying, drying each layer 151, 152 can be performed without rinsing, or both rinsing and drying can be performed after application of each layer 151, 152.

Figure 3:
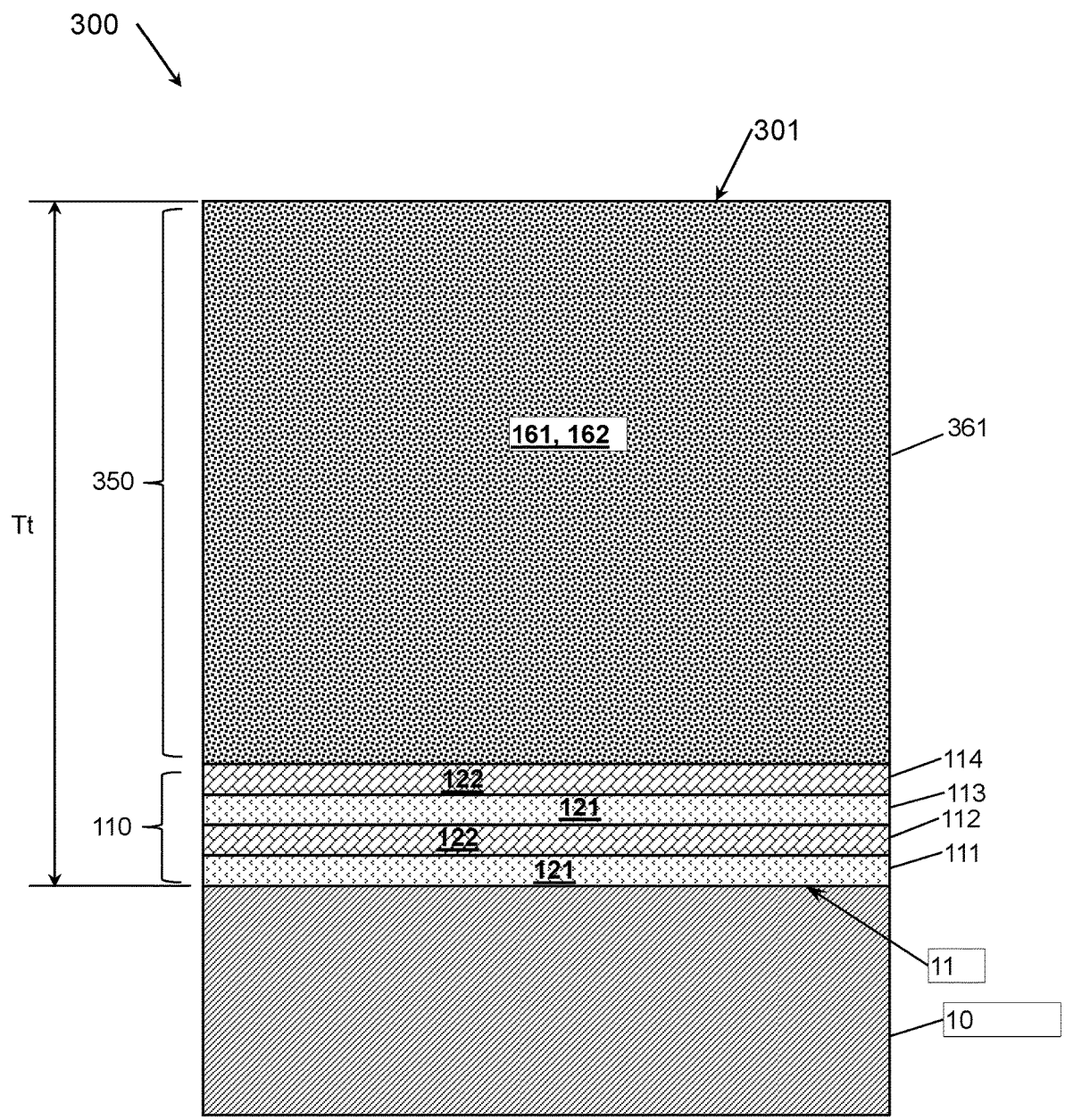
FIG. 3 is a schematic cross-sectional view of an embodiment of an anticorrosion coating in accordance with the principles described herein.

Referring now to FIG. 3, an embodiment of a coating 300 applied to a bare metal substrate 10 is shown. Metal substrate 10 is as previously described. Coating 300 is a coating applied to outer surface 11 of metal substrate 10 to protect metal substrate 10 from corrosion. Accordingly, coating 300 may also be referred to herein as an "anticorrosion" coating or a "corrosion resistant" coating. As previously described, metal substrate 10 can be any metal or metal alloy for which enhanced corrosion resistance is desired. However, embodiments described herein may be particularly suited for use with aluminum and aluminum alloy components and parts. As shown in FIG. 3, coating 300 is directly applied to the outer surface 11 of metal substrate 10 and has a total thickness Tt measured perpendicularly from outer surface 11 of metal substrate 10 to the outermost surface 301 of coating 300. In this embodiment, the total thickness Tt is preferably 1.0 to 2.0 μm. In this embodiment, the coating 300 includes a first composition 110 disposed directly on outer surface 11 and a second composition 350 disposed on first composition 110. Thus, the first composition 110 is positioned or sandwiched between outer surface 11 of metal substrate 10 and second composition 350. The first composition 110 is as previously described with respect to FIG. 1, and thus, will not be described again in detail.

Referring still to FIG. 3, in this embodiment, the second composition 350 comprises a homogeneous mixture 361 of positively charged polymer 161 and negatively charged silicate clay 162. The cationic polymer 161 and anionic silicate clay 162 are each as previously described with respect to FIG. 1. In particular, the positively charged polymer 161 in mixture 361 of the second composition 350 is preferably selected from branched polyethylenimine (BPEI), linear polyethylenimine (LPEI), poly(diallyldimethylammonium chloride) (polyDDA), poly(allylamine hydrochloride), or combinations thereof, and more preferably BPEI. The negatively charged silicate clay 162 in mixture 361 of the second composition 350 is preferably selected from montmorillonite (MMT), organo-modified MMT, laponite, vermiculite, or combinations thereof, and more preferably MMT. The concentration of clay 162 in the mixture 361, and hence second composition 350 itself, preferably comprises about 50 wt. % to about 97 wt %, and more preferably about 60 wt. % to about 90 wt. %.

Figure 4:
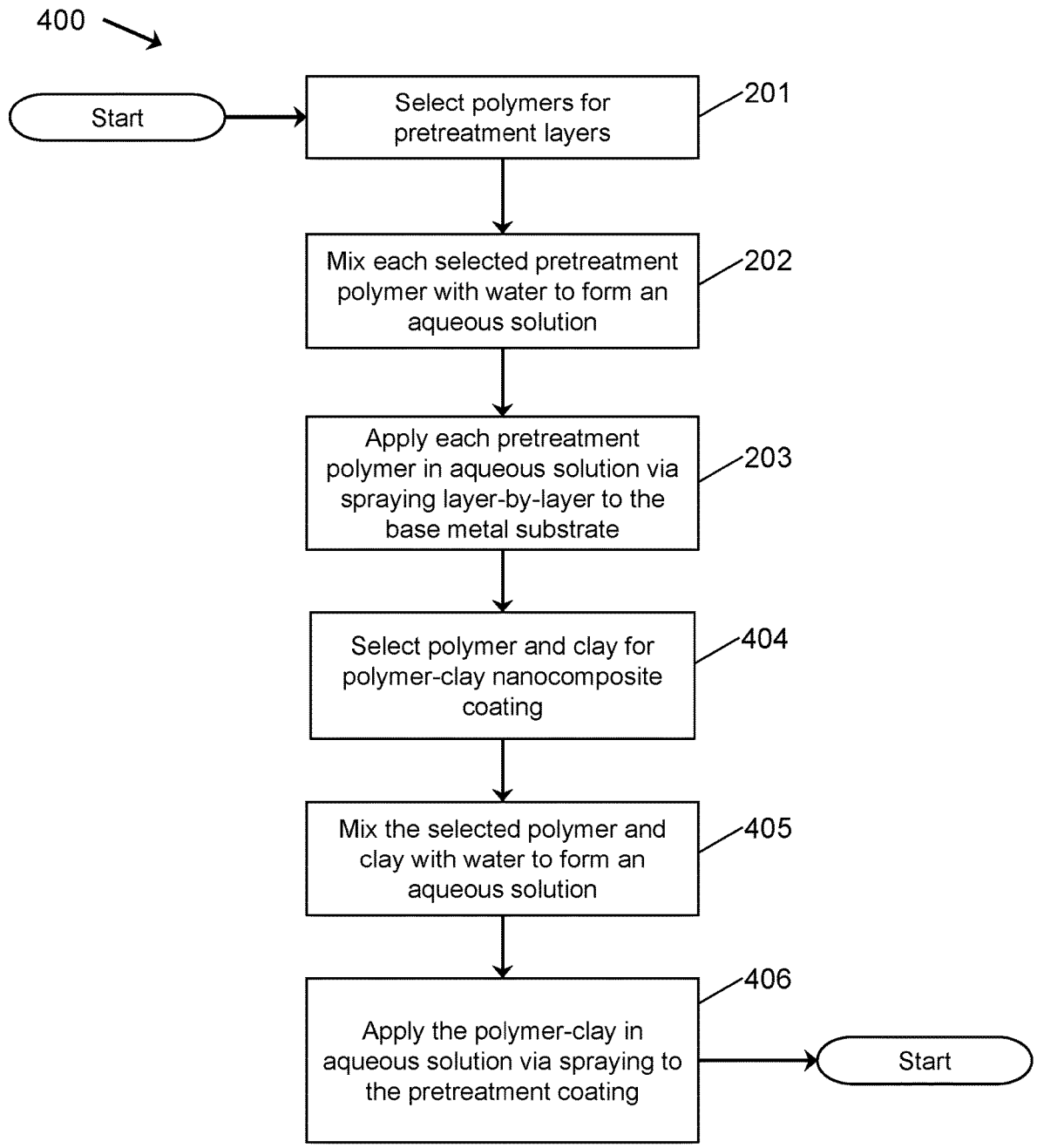
FIG. 4 is a flowchart illustrating an embodiment of a method for applying the anticorrosion coating of FIG. 3.

Referring now to FIG. 4, a flow chart illustrating an embodiment of a method 400 for applying pretreatment coating 300 to substrate 10 is shown. In this embodiment, method 400 includes blocks 201, 202, 203, each as previously described with respect to FIG. 2, and thus, will not be described again in detail. At block 404, the polymer 161 and the clay 162 are selected to use in mixture 361 of the first composition 350. Next, in block 405, an aqueous solution including both the selected polymer 161 and the selected clay 162 is formed. Although a single aqueous solution including both the selected polymer 161 and selected claim 162 is formed in this embodiment, in other embodiments, separate aqueous solutions of the selected polymer 161 and the selected clay 162 can be formed and then mixed in different proportions to form a single homogeneous aqueous solution including both the selected polymer 161 and the selected clay 162. Thus, unlike method 200 previously described in which separate aqueous solutions of the polymer 161 and the clay 162 are formed, in this embodiment of method 400, a single homogenous aqueous solution including both the polymer 161 and the clay 162 is formed. In embodiments described herein, the aqueous solution comprising the selected polymer 161 (e.g., BPEI) and the selected clay 162 is formed by mixing the polymer 161 and the clay 162 together with Milli-Q® $H_2O$ (18.2 MΩ·cm at 25° C.) or deionized water. In some embodiments, the concentration of the polymer 161 in the homogenous aqueous solution is about 0.5 wt. % to 1.0 wt. % and the concentration of the clay 162 in the homogenous aqueous solution is about 0.5 wt. % to 1.8 wt. %. In other embodiments where separate aqueous solutions of the polymer 161 and the clay 162 are formed and then subsequently mixed, the concentration of the polymer 161 in its separate aqueous solution is about 0.5 wt. % to about 2.0 wt. %, and the concentration of the clay 162 in its separate aqueous solution is about 1.0 wt. % to about 2.0 wt. % in a separate aqueous solution.

Referring still to FIG. 4 and moving to block 406, the homogenous aqueous solution of polymer 161 and clay 162 is sprayed onto the first composition 110. In this embodiment, the aqueous solution of polymer 161 and the aqueous solution of clay 162 is preferably sprayed at block 406 using an air pressure of about 30.0 psig. It is to be understood that the actual air pressure may be adjusted in various embodiments depending upon the type of solution being applied and the distance between the spray nozzle and the target. Although the second composition 350 comprises homogenous mixture 361 throughout, it can be applied by spraying the aqueous solution formed in block 405 in multiple layers, where each layer is allowed to dry for about 10-30 seconds prior to spraying the subsequent layer. In general, drying can be performed by simply allowing each layer to air dry, by application of pressurized air, by exposing the layer to a gentle elevated temperature (e.g., 90° C.), or combinations thereof. Although the embodiment of coating 300 shown in FIG. 3 includes first composition 110 disposed on substrate 10 and second composition 350 disposed on first composition, in other embodiments, first composition 110 is not included. In such embodiments, the second composition 350 is applied directly on the surface 11 of substrate 10 according to blocks 404, 405, 406.

To further illustrate various illustrative embodiments of the present invention, the following examples are provided.

Example 1: LbL Process and Results

BPEI/MMT spray-assisted LbL thin coatings were deposited on silicon wafers and Al2024T3 panels, using an automated spray-assisted LbL system (Svaya Nanotechnologies), for the growth profile and corrosion testing respectively. The silicon wafers were cleaned by soaking them in basic piranha solution ($H_2O:H_2O_2:NH_4OH$, 5:1:1 volume ratio) at 70° C. for 15 minutes. Then, the silicon wafers were rinsed with Milli-Q® $H_2O$ and blow dried. Al2024T3 panels (2 in×2 in) were cleaned and degreased with acetone, rinsed with ethanol and Milli-Q® $H_2O$, sonicated in Milli-Q® $H_2O$ for 15 minutes, and blow-dried. All cleaned pieces of silicon wafer and Al2024T3 were plasma treated just before depositing the coating.

LPEI and PAA solutions with concentrations of 20 mM and 5 mM correspondingly were used as anchor layers to improve the coating growth. Two layer pairs of LPEI and PAA were sprayed (10 seconds (s)) on the plasma treated substrates (silicon wafer or aluminum alloy panel). Milli-Q® $H_2O$ at pH 4 was sprayed (10 s) in between layers of LPEI and PAA to rinse any excess of the polyelectrolyte solutions. Deposition of the PEI/PAA anchor layers was followed by alternated deposition (10 s of spraying, 1 min of air blow-drying) of the BPEI and MMT solutions until achieving the desired number of layer pairs (n). Pressures of 25 and 30 psi were used to assemble the coatings for the growth profile. A pressure of 30 psi was used to assemble the coatings for corrosion testing. Samples were dried in a convection oven at 70 C for 30 minutes.

Thickness of the BPEI/MMT spray-assisted LbL films was measured using a profilometer (P-6, KLA-Tencor). The mass and the density of the LbL films were measured using a quartz crystal microbalance (Maxtek-RQCM, Inficon). To evaluate the surface morphology and quality of the coating, scanning electron microscopy (SEM) images were taken before and after electrochemical testing using a JEOL JSM-7500F field emission SEM. Morphology of the cross-section of the layer-by-layer film was confirmed by transmission electron microscopy (TEM) on the as prepared film using 177.8 μm (7 mil) PET (ST505, produced by Dupont-Teijin) as a substrate. Composition of the samples before and after corrosion testing was determined by electron diffraction spectroscopy (EDS) and corroborated by using an Omicron XPS/UPS system with *Argus* detector. The contact angle of the layer-by-layer coatings was measured using a goniometer and the coating water uptake was measured using a potentiostat Gamry Interface 1000 following the REAP methodology. Oxygen transmission rate testing was performed by MOCON (Minneapolis, Minn.), on a MOCON Oxtran 2/21 L Oxygen Permeability Instrument according to the ASTM D-3985. OTR was tested at 0% RH (dry conditions) and 90% RH using 177.8 μm PET as a substrate.

Electrochemical impedance spectroscopy (EIS): Impedance measurements were performed at the frequency range of $10^{-2}$ Hz-$10^5$ Hz using a potentiostat Gamry Interface 1000. The electrolyte solution used was 5 wt % NaCl in order to correlate EIS results to Salt spray testing results. The coated Al2024T3 samples were used as the working electrode, which had an exposed area of 1 $cm^2$ or 1.77 $cm^2$. A platinum cylindrical mesh was used as the counter electrode and a saturated calomel electrode (SCE) was used as the reference electrode. These measurements were performed at room temperature using a paint test cell placed in a Faraday cage. Before impedance testing, samples were left in contact with the 5 wt % NaCl solution for 30 minutes during which the open circuit potential (OCP) was measured. A BPEI/PAA LbL coating made of 8 bilayers was used as a control. Samples were tested in triplicates for 40 days and left in contact with the electrolyte solution during 50 days, after which SEM images were taken. Experimental data obtained from the EIS test was fitted with the Zview software. A representative measurement was chosen for the Bode, Nyquist, and phase angle plots.

Salt spray testing ASTM B117: Samples were placed in a fog chamber and exposed during 7 days (168 hours) to a 5 wt % sodium chloride solution at 35° C. Before testing, the back and edges of the samples were covered with protective clear tape. A scribed line of 3-3.5 cm of length was made through the coating to expose the underlying metal. This test sought to determine the evolution of corrosion on the coated and abraded areas of the sample.

Figure 5:
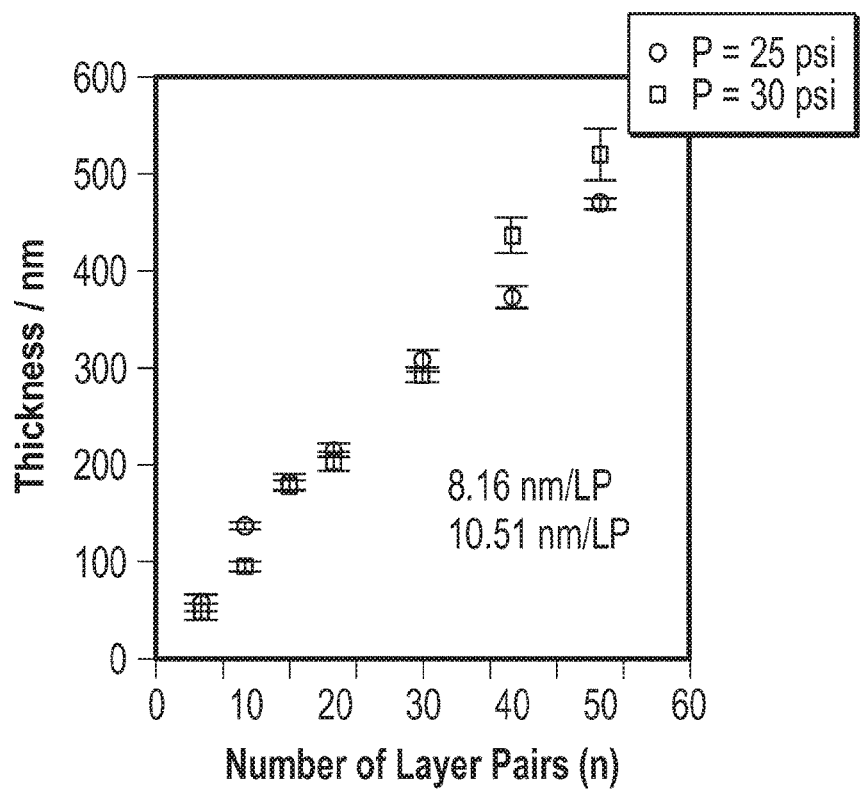
FIG. 5 is a chart showing the thickness of the (LPEI/PAA)$_2$(BPEI/MMT)$_n$ layer-by-layer coatings (as a function of the number of layer pairs) applied to silicon wafers in accordance with certain embodiments of the present disclosure.

FIG. 5 shows the thickness of the $(LPEI/PAA)_2(BPEI/MMT)_n$ layer-by-layer coating as a function of the number of layer pairs (n), which was investigated on silicon wafers by means of profilometry. Each data point represents the average of 5 measurements. Two different pressures (25 and 30 psi) on the compressed air source were investigated. The BPEI/MMT coating shows a characteristic linear growth for both pressures. The thickness per layer pair (n) was taken as the calculated slopes 8.16 and 10.51 nm for pressures of 25 and 30 psi correspondently. The thickness per layer pair was calculated for 10<n<50. The smoothness of the film was also calculated by profilometry where the root-mean-square (rms) roughness for a film with n=40 (~440 nm) was of 180 nm. The pH of the BPEI and MMT solutions were chosen in order to obtain higher adsorption of each component and consequently higher thickness per deposited layer pair. Because BPEI is considered a weak polyelectrolyte, its charge density changes as a function of pH and ionic strength. When the BPEI solution is at pH 10 its charge density is low, allowing more mass to be deposited onto the negatively charged substrate or the previously deposited layer of MMT. The faces of the MMT platelets are negatively charged regardless of the pH of the solution. However, its pH changes the charge density of the previously deposited BPEI layer and therefore the deposition of MMT platelets. The pH chosen for the MMT solution was 4.

Figure 6A:
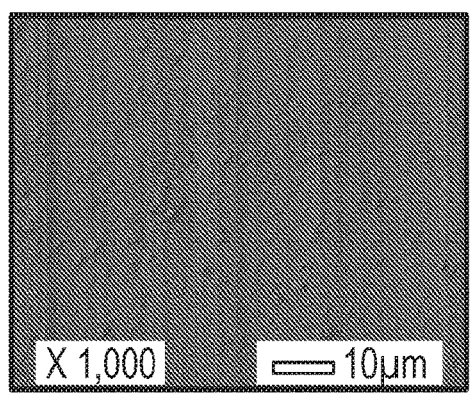
FIGS. 6A-6C are SEM images of the (LPEI/PAA)$_2$(BPEI/MMT)$_{40}$ layer-by-layer coating applied to Al2024 in accordance with certain embodiments of the present disclosure.
Figure 6B:
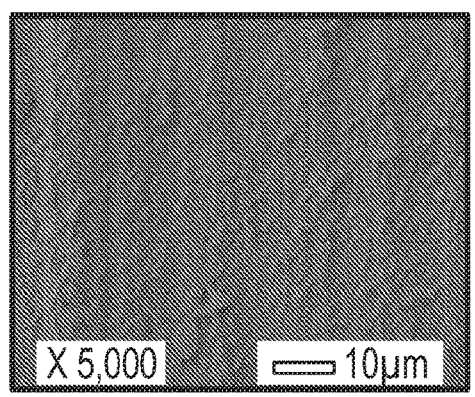
Figure 6C:
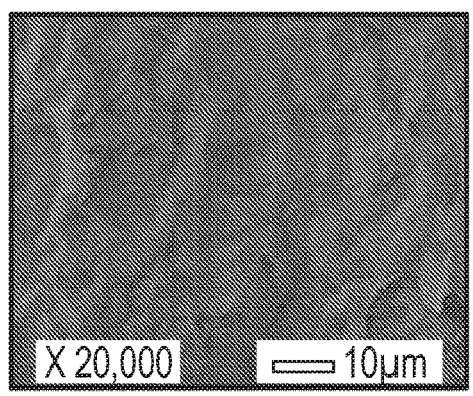
Figure 6D:
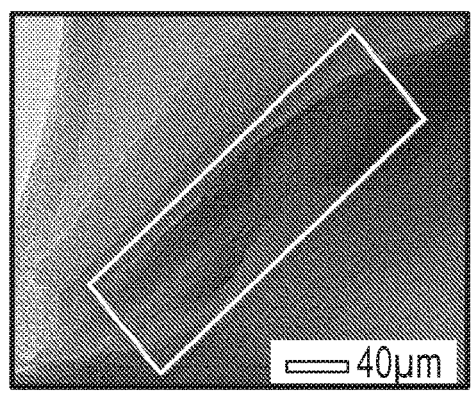
FIG. 6D is a TEM image of a cross-section of the (LPEI/PAA)$_2$(BPEI/MMT)$_{40}$ layer-by-layer coating prepared in accordance with certain embodiments of the present disclosure.

FIGS. 6A-6C are SEM images of the as-prepared $(LPEI/PAA)_2(BPEI/MMT)_{40}$ coating prior to corrosion testing. FIG. 6D is a TEM image of a cross-section $(LPEI/PAA)_2(BPEI/MMT)_{40}$. FIG. 6A shows an image taken at 1000× magnification; FIG. 6B shows an image taken at 5000× magnification, and FIG. 6C shows an image taken at 20,000× magnification. The SEM images in FIGS. 6A-6C were taken before exposure of the coated Al2024 samples to 5 wt % NaCl solution. Samples were sputtered with 5 nm of Pt/Pd (80/20) alloy due to the calculated low conductivity of the BPEI/MMT film, $\sigma = 9 \times 10^{-10}$ S/cm. SEM images at different magnifications allowed to evaluate the uniform deposition of the coating onto the underlying metal and the smoothness of the surface.

Figure 7A:
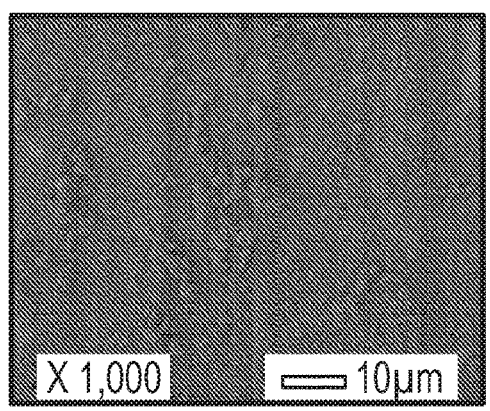
FIGS. 7A-7C are SEM images for of the (LPEI/PAA)$_2$(BPEI/MMT)$_{40}$ layer-by-layer coating applied to Al2024 in accordance with certain embodiments of the present disclosure after 50 days of exposure to NaCl 5 wt %.
Figure 7B:
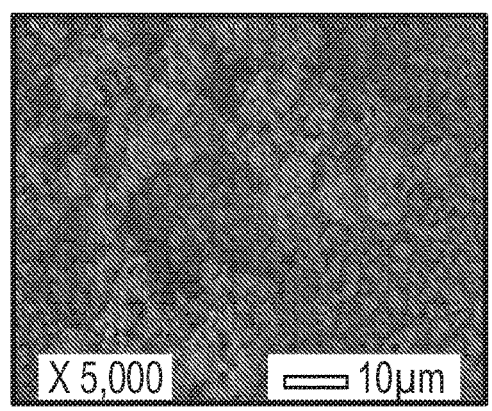
Figure 7C:
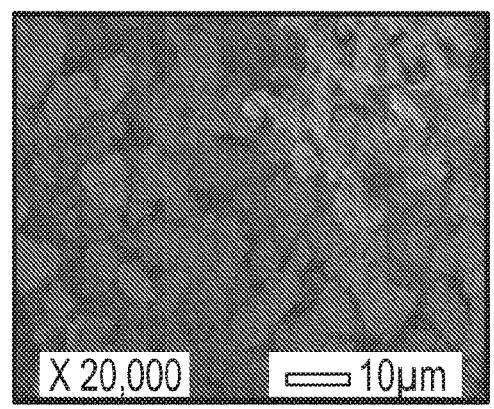

FIGS. 7A-7C are SEM images for $(LPEI/PAA)_2(BPEI/MMT)_{40}$ after 50 days of exposure to NaCl 5 wt % (using electrochemical impedance spectroscopy). FIG. 7A is an SEM image taken at 1000×, FIG. 7B is an SEM image taken at 5000×, and FIG. 7C is an SEM image taken at 20,000×. Good coverage of the aluminum substrate after 50 days of exposure to NaCl 5 wt % is observed. It appears that some of the polymer has been dissolved, thus leaving the MMT particles exposed. MMT particles seem to have aggregated favoring their natural stacked state.

Figure 8:
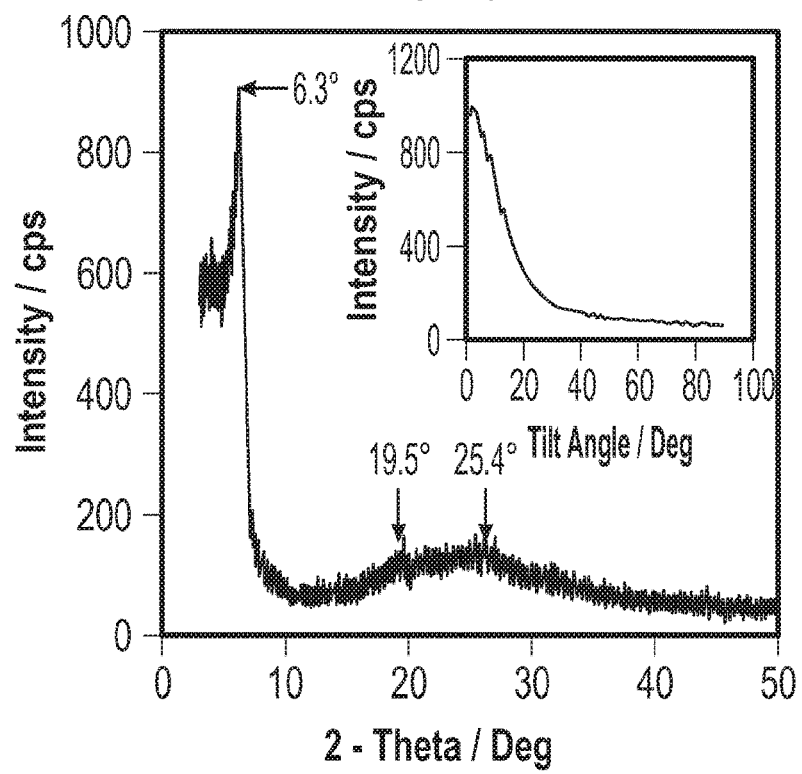
FIG. 8 is a 2-theta pattern for the (LPEI/PAA)$_2$(BPEI/MMT)$_{100}$ layer-by-layer coating applied to Al2024 in accordance with certain embodiments of the present disclosure.
Figure 9A:
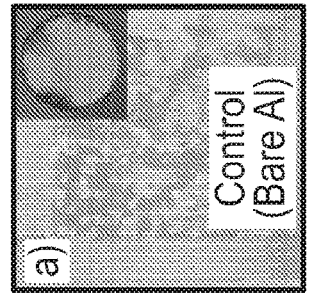
FIGS. 9A-9E are images illustrating the corrosion resistance of the (LPEI/PAA)$_2$(BPEI/MMT)$_n$ layer-by-layer coatings (as a function of the number of layer pairs) fabricated in accordance with certain embodiments of the present disclosure and illustrating the increase in corrosion resistance as the number of layer pairs in the anticorrosion coating increase.
Figure 9B:
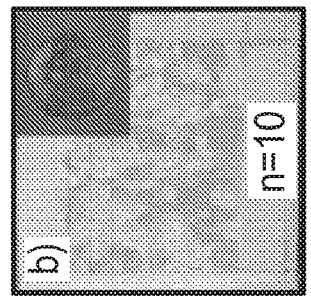
Figure 9C:
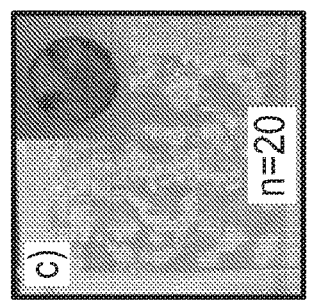
Figure 9D:
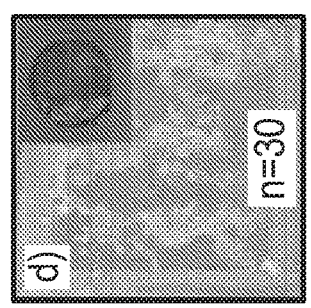
Figure 9E:
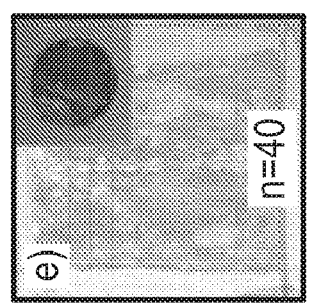

FIG. 8 is a theta pattern for the $(LPEI/PAA)_2(BPEI/MMT)_{100}$ coating, which was used to determine the orientation of the clay platelets with respect to the substrate. The inset graph in FIG. 8 corresponds to the χ-pattern at 6.3°. Wide-angle X-ray diffraction was performed on a layer-by-layer film of $(LPEI/PAA)_2(BPEI/MMT)_{100}$ where the clay was assembled as the topmost layer. As observed in FIG. 8 this film exhibited one very distinct peak at 6.30 with a basal (d001) spacing of 14.0 Å. Two other peaks at 19.5° and 25.4° with basal spacing of 4.5 Å and 3.5 Å respectively, suggest that several clay platelets are deposited per clay deposition step (FIG. 6D). As observed in the inset in FIG. 8, there is a maximum when the tilt angle (χ)=0, which indicates the preference of the clay platelets to be parallel oriented with the substrate. This was corroborated by calculating the Herman's orientation parameter (f) in order to quantify the degree of orientation between the LbL assembly. f ranges from −0.5 to 1, where the clay platelets are oriented perpendicular or parallel to the substrate respectively. When f equals zero, means random orientation. Herman's orientation parameter (f) was found to be 0.31, meaning that the clay platelets between the LbL assembly have a preferential parallel orientation towards the glass substrate.

FIGS. 9A-9E show that corrosion resistance increases upon increasing the number of layer pairs for coatings fabricated according to certain embodiments of the present disclosure. In order to assess the performance of the layer-by-layer coating $(LPEI/PAA)_2/(BPEI/MMT)_n$, coatings with 10, 20, 30 and 40 layer pairs and the bare metal were imaged 7 days (168 hours) after exposure to NaCl 5 wt. % at 35° C. in accordance with ASTM B117. From this test it was established that the coating composed of 40 layer pairs was the best in terms of performance.

Figure 10A:
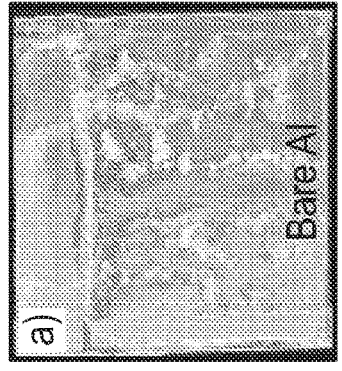
FIGS. 10A-10D are images of the (LPEI/PAA)$_2$(BPEI/MMT)$_n$ layer-by-layer coating applied to Al2024 in accordance with certain embodiments of the present disclosure after 7 d (168 h) of salt-spray exposure.
Figure 10B:
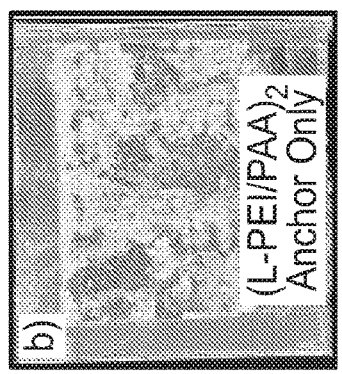
Figure 10C:
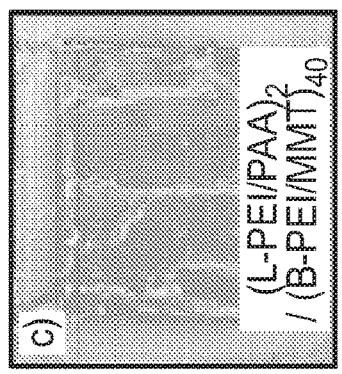
Figure 10D:
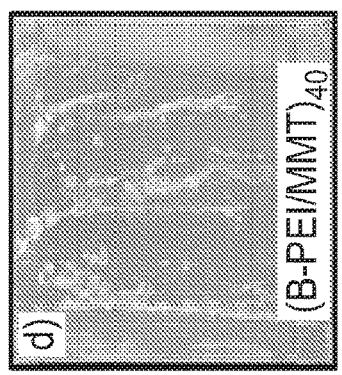

FIGS. 10A-10D illustrate images of samples 7 days (168 h) after exposure to a salt-spray comprising 5% NaCl at 35° C. in accordance with ASTM B117. The samples shown in FIGS. 10A-10D were used to establish the influence or contribution of the anchor layers (i.e., pretreatment) and the MMT platelets in the corrosion resistance. FIG. 10A Bare Al, FIG. 10B Anchor layers only $(LPEI/PAA)_2$, FIG. 10C Anchor layers+LbL $(LPEI/PAA)_2/(BPEI/MMT)_{40}$, and FIG. 10D (no anchor layers)+LbL $(BPEI/MMT)_{40}$. FIG. 10B shows that the anchor layers $(LPEI/PAA)_2$ are not responsible for the exhibited corrosion inhibition, this is confirmed by FIGS. 10C and 10D where the corrosion resistance provided by the layer-by-layer coatings with n=40 with and without anchor layers are compared. FIGS. 11A and 11B are Bode plots illustrating changes for various numbers of bilayers (n) for $(LPEI/PAA)_2/(BPEI/MMT)_n$ at (FIG. 11A) day 1 and (FIG. 11B) day 40 of immersion in NaCl 5 wt %. FIGS. 11A and 11B show that the system with n=40 showed the most significant change in impedance from $5.5 \times 10^4$ Ohm-cm$^2$ to $1.5 \times 10^5$ Ohm-cm$^2$. For the other systems with n<40 the impedance values at low frequencies increased as time went by. This raise in the impedance may be associated with the synergetic effect of the BPEI surface buffering which hinders the corrosion process, the 'plugging effect' of the corrosion products, and the MMT barrier properties which makes the oxygen molecules and Cl-ions travel paths towards the metal surface to become long and tortuous thus helping to slow down the corrosion process.

FIG. 12 illustrates chemical compositions calculated using EDS for coated aluminum panels with $(LPEI/PAA)_2/(BPEI/MMT)_{40}$ before and after corrosion test (EIS). It is noted that Fe, Na, and Mn are <0.15 atomic %. FIG. 12 shows the composition of the coated aluminum panels before and after corrosion testing. Initially the calculated composition of the coated sample comprises mainly aluminum, oxygen, carbon, silicon, nitrogen, copper, and magnesium. The elements present come from the aluminum alloy and the layer-by-layer MMT/BPEI coating. After 50 days of exposure to NaCl 5 wt %, three areas were studied, pit (area 1), around the pit (area 2), and were no visible corrosion was observed (area 3). It is clear that after the corrosion test some corrosion products are present on all areas as evidenced by the increase of the oxygen content. Area 3, showed no presence of nitrogen after corrosion testing, which led to believe that some of the polymer may have dissolved. Although no visible corrosion was observed in area 3, there is presence of corrosion products, which together with the layer-by-layer coating are believed to have a synergetic effect on the protection of the metal from corrosion.

Airbrushed One-Pot Pretreatment Coating

FIG. 13 is a flow chart of an embodiment of a method 1300 of fabricating a pretreatment coating according to certain embodiments of the present disclosure. As shown at block 1302 in FIG. 13, the BPEI/MMT one-pot mixture was prepared by simple mixing of an aqueous dispersion of negatively charged MMT (1 wt %) with an aqueous solution of positively charged BPEI (1 wt %). This mixing forms an intercalated mixture with an interlayer spacing ($D_{int}$ in FIG. 14C discussed below). The natural pH values of the BPEI (pH 10.9) solution and the MMT dispersion (pH 9.5) were not adjusted; the pH of the final mixture was around 11.0. Upon mixing, the solution-dispersion became opaque and the viscosity increased, evidencing affinity of the two components by electrostatic attractions. The BPEI/MMT one-pot mixture was then airbrushed onto a substrate at block 1304. In one example, the substrate is aluminum, but, in alternate embodiments, the substrate may comprise silicon, glass, and/or an aluminum alloy such as 2024-T3. In some embodiments, for example, at block 1306, the substrate may be pretreated, including a heating, cooling, or surface treatment (e.g., etching or blasting). In some examples, the pretreatment at block 1306 may include cleaning, degreasing and/or other treatments that increase the surface roughness of the substrate, the pretreatment of the substrate is not to be confused with and is not the same as the pretreatment coating on the substrate that may be part of a multi-layer anti-corrosion coating on the substrate. In one example, a surface roughness of a substrate may be from about 500 nm to about 1700 nm.

In one example, at block 1306, the substrate may be held at a temperature, for example, from 70-80° C. during the deposition (airbrushing) at block 1304. In some embodiments, after spraying one or more layers of the first composition on the substrate at block 1304, the substrate is further processed at block 1308. A "layer" of pretreatment coating airbrushed at block 1304 may refer to a single pass of the airbrushing equipment over a portion or all of the substrate. A "deposition" of a composition may comprise one or more layers. In one example, the airbrushing may be performed from about 20 psi to about 40 psi, depending upon the equipment used and the volume being disposed on the substrate. Higher or lower pressures such as 5-20 psi or 40-100 psi may be used depending upon the embodiment. The coating formed at block 1304 may be up to about 2 microns thick, as measured from the surface outward. In alternate examples, the coating formed may be from about 0.5 microns to about 25 microns, or greater. This further processing at block 1308 may include packaging for later coating applications, further coating applications for different layers of an anti-corrosion coating, cutting, polishing, forming, or other operations.

In another example, subsequent to application (deposition) of the first composition to the substrate at block 1304, a second polymer-clay composition that is mixed at block 1310 may be disposed, for example, by airbrushing, on the first composition, to form a second layer. The second composition formed at block 1310 may be different from the first composition in at least one of (1) the polymer:clay ratio, (2) the type of polymer used, (3) the type of clay used, (4) the volume v applied to the substrate, 5) the number of layers (airbrushing passes) performed at block 1304, 6) the intercalation degree/distance (interlayer spacing ($D_{int}$)), and/or 7) the thickness of the layer formed. In one example, the thickness of the first composition is greater than that of the second composition, and in another example, the thickness of the first composition is less than that of the second composition. At block 1308, the coated substrate may be subject to further processing. It is to be understood that the mixing at blocks 1302 and/or 1310 may be performed prior to the airbrushing at block 1304, and that, in some examples, additional different compositions that may differ in at least one of (1)-(7) discussed above may also be used. Further, the mixing at blocks 1302 and 1310 may be performed at about room temperature, e.g., from about 20 C. to about 25 C., and in other embodiments, the mixing may be performed at a higher temperature.

In some examples, the airbrushing at block 1304 may be performed from about 3 minutes to about 30 minutes, and each pass of the airbrushing may varying in time based upon factors such as the size and shape of the substrate as well as the volume being disposed. While the substrates illustrated herein are shown to be substantially flat and smooth, surfaces with varying roughness as well as varying shapes and contours may also be airbrushed, the easy manipulation of the airbrushing equipment enables even coating of curved, rounded, and sharp features of a substrate. The airbrushing discussed at block 1304 may occur on multiple sides of a substrate simultaneously, and may employ multiple spray heads or devices. In one example, it may take about 15 minutes to dispose 1-3 ml of a one-pot polymer/clay composition on a substrate that is a 2 inch (5.08 cm) square. In some examples, the airbrushing may occur at room temperature (e.g., the substrate may be heated or cooled but the environment is not) and in other examples, the airbrushing may occur in a cooled or elevated temperature environment and/or under clean room or other conditions.

FIGS. 14A-14C are schematic illustrations of embodiments of pretreatment coatings formed via embodiments of the method of FIG. 13. In FIG. 14A, a structure 1400 is illustrated. The substrate 1402, which may comprise silicon, glass, aluminum, other metals and metallic, and/or a metal alloy such as an aluminum alloy grade 2024-T3, has a pretreatment coating 1404 airbrushed on to it to form the coating 1408 with a total thickness Tt. As discussed above, Tt may be from about 0.5 µm to greater than 5 µm, and, in some embodiments, may be from about 1.5 µm to about 2.5 µm. The layer 1404 comprises intercalated clay, as shown in detail in FIG. 14C and discussed below. FIG. 14B shows an embodiment 1400B of a pretreatment coating where the substrate 1402 has a first composition deposition 1404 of an intercalated, one-pot polymer/clay mixture formed on the substrate 1402, and a deposition of a second composition of an intercalated, one-pot polymer/clay mixture 1406 formed on the first composition 1404. Thus, the pretreatment coating 1410 comprises a total thickness Tt that is made up of a thickness $T_{1404}$ of the first composition deposition 1404 and a thickness $T_{1406}$ of the second composition deposition 1406. While $T_{1404}$ is shown in FIG. 14B to be greater than $T_{1406}$, in alternate embodiments, the two or more compositions employed to form the coating 1410 may comprise substantially equivalent thicknesses.

FIG. 14C is an exploded view 1400C of the first composition deposition 1404 from FIG. 14B. FIG. 14C shows a plurality of clay platelets 1412 with a polymer 1414 intercalated between each pair of adjacent clay platelets 1412. Each platelet 1412 of the plurality of platelets may comprise a first dimension D1 measured in the direction of the x-axis from about 15 nm to about 3000 nm, and in some examples from 10 nm to 1000 nm, this may also be described as the maximum diameter of the platelet 1412. A second dimension D2 may be measured in the direction of the y-axis, as indicated in FIG. 14C, and may be from 0.25 nm to about 3 nm, and in some examples may be about 1 nm. In some examples, a third dimension (not shown) of the platelets 1412 may be measured perpendicular to the first dimension D1 and may be from about 3 nm to about 3000 nm, and in some examples from 30 nm to 1000 nm. The third dimension is not shown in FIG. 14C since that dimension would be measured into the page as indicated by the z-axis 1416, and may measure from about 0.25 nm to about 3 nm, and in some examples may be about 1 nm. FIG. 14C additionally shows $D_{int}$, the interlayer spacing, which is the average distance between each pair of platelets in the coating. Depending upon the embodiment, $D_{int}$ may be from about 0.25 nm to about 10 nm, in some embodiments, a range from 1 nm to 2 nm may be desirable.

To further illustrate various illustrative embodiments of the present invention, the following examples are provided.

Example 2: One-Pot Process and Results

In one example, cloisite Na+ montmorillonite (MMT) was used along with branched polyethylenimine (BPEI) $M_w$~25,000 g-mol$^{-1}$ and $M_w$~2,000,000 g-mol$^{-1}$. Aluminum alloy 2024-T3 coupons, silicon wafers, glass slides and polyethylene terephthalate ST505 (PET, 177.8 μm) were also employed. PET, silicon wafers, glass slides, and aluminum alloy panels were used for transmission electron microscopy (TEM) and oxygen transmission rate (OTR), growth profile, wide angle X-ray diffraction (WAXD), and corrosion testing, correspondingly. Silicon wafers and glass slides were cleaned by immersion in basic piranha solution ($H_2O$:$H_2O_2$:$NH_4OH$, 5:1:1 volume ratio) at 70° C. for 15 min, rinsing (Milli-Q water) and drying. PET was cleaned by alternating rinsing with methanol and Milli-Q water. Polished and non-polished aluminum alloy coupons were cleansed with acetone, ethanol and Milli-Q water, followed by sonication in Milli-Q water for 15 min, rinsing and drying. All cleaned substrates were not plasma treated. As discussed herein, each polymer/clay nanocomposite coating (pretreatment) is identified by the polymer-clay ratio and volume of the one-pot mixture disposed on the substrate. For example, BPEI/MMT nanocomposite coating is identified by the polymer-clay ratio and volume of the one-pot mixture used to make the coating. For example, $(BPEI_x/MMT_y)_v$ identifies a coating with 'x' wt % BPEI and 'y' wt % MMT made by airbrushing 'v' milliliters of a BPEI/MMT one-pot mixture with a x:y polymer-clay ratio, where y may also be expressed as "1−x" as a ratio or "100−x" if expressed as a percentage. The pretreatment coatings discussed herein were prepared with BPEI molecular weight (Mw) 25,000 g-mol$^{-1}$ unless otherwise stated.

Corrosion Testing:

Salt spray testing— Salt spray testing was performed by Axalta Coating Systems during 7 d (168 h) in compliance with ASTM B117. Scribe length, 3-3.5 cm.

Dynamic Viscosity:

Dynamic viscosity (η) measurements were performed at 25° C. and 100 RPM, using an Anton Paar MCR 301 rheometer with a coaxial double gap cup and bob accessory (DG26.7-SS).

Electrochemical Impedance Spectroscopy—

Electrochemical impedance spectroscopy (EIS) measurements were conducted with a potentiostat Gamry Interface 1000 in a frequency range of $10^{-2}$ Hz-$10^5$ Hz. Measurements were executed at room temperature in a three electrode configuration paint cell. The three electrode configuration included the sample as working electrode, a Pt cylindrical mesh as counter electrode, and a saturated calomel reference electrode. The tested area of the working electrode was either 1 cm$^2$ or 1.7 cm$^2$. For comparison purposes with salt spray testing, 5 wt % NaCl was chosen as the electrolyte solution. All samples were enabled to reach an equilibrium state for 30 minutes before EIS measurements, during which the open circuit potential (OCP) was measured. The EIS experimental set-up was enclosed in a Faraday's cage. Zview software was used for experimental data fitting. Samples were measured in triplicates but only one sample was chosen for data representation. All EIS measurements and salt spray testing were performed on cleaned, as-received aluminum alloy coupons unless otherwise stated.

Wide Angle X-Ray Diffraction—

A BRUKER D8 X-ray diffractometer (Cu Kα, λ=1.541 Å) was used for wide angle X-ray diffraction (WAXD) measurements at room conditions (25° C. and ~40% RH), with a 2θ range of 3° to 50θ, and a rate of 0.01°/s.

Growth Profile—

The coating thickness and roughness were measured using a profilometer P-6, KLA-Tencor. The average of 5 profilometry measurements constituted one data point.

Scanning Electron Microscopy and Transmission Electron Microscopy—

A JEOL JSM-7500F field emission scanning electron microscopy (SEM) was used to capture surface and cross-sectional images of the samples. Due to the non-conductive nature of the BPEI/MMT film, samples were sputtered with 4-5 nm of Pt/Pd (80/20) alloy for SEM analysis. Cryogenic transmission electron microscopy (TEM) was used for further cross-sectional analysis of the as-prepared BPEI/MMT film.

Adhesion—

Adhesion of the intact $(BPEI_{20}/MMT_{80})_3$ coating to the aluminum alloy was evaluated through a tape test, where a VWR general lab tape was used.

Hydrophilic-Hydrophobic and Gas Barrier Properties—

The BPEI/MMT film water uptake was measured with a potentiostat Gamry Interface 1000. Receding and advancing contact angles were measured using a goniometer. Oxygen transmission rate (OTR) measurements at dry conditions (0% RH, 23° C.) using an Oxtran 2/21 L Oxygen Permeability Instrument (ASTM D-3985) were performed by MOCON (Minneapolis, Minn.).

Energy Dispersive Spectroscopy and X-Ray Photoelectron Spectroscopy—

Elemental analysis was performed to determine sample composition through energy dispersive spectroscopy (EDS) and verified by X-ray photoelectron spectroscopy (XPS). A JEOL JSM-7500F field emission SEM/EDS and an Omicron XPS system with *Argus* detector were used for EDS and XPS analysis, respectively.

Figures 15A, 15B, 15C, 15D, 15E, 15F, 15G, 15H, 15I, 15J, 15K, 15L:
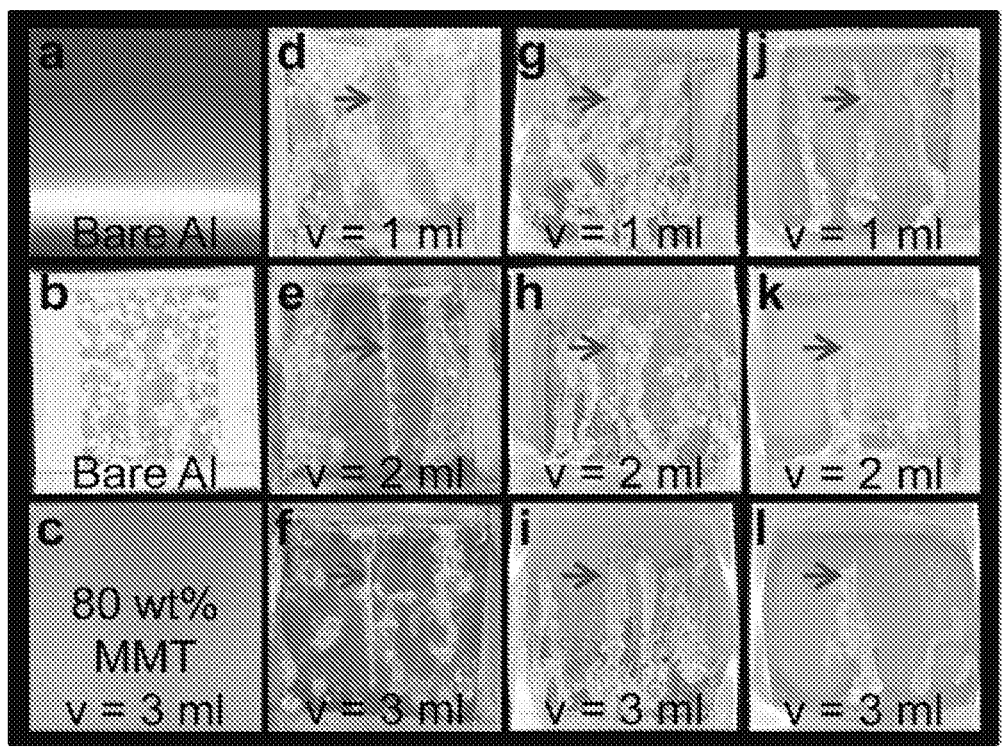
FIGS. 15A-15L are images of the bare and coated aluminum alloy (in accordance with Example 2) before and after 7 d salt spray testing.

Salt Spray Testing:

Three BPEI/MMT one-pot mixtures with polymer-clay ratios of 50:50, 20:80, and 10:90 were prepared and applied onto aluminum alloy coupons. In alternate examples, polymer-clay ratios such as 5:95, 15:85, 30:70, or 40:60. Scribed coated coupons were exposed to salt spray testing (ASTM B117, 5 wt % NaCl at 35° C.) to assess the effect of the polymer-clay ratio on the anticorrosion properties. FIGS. 15A-15L show digital pictures of the bare and coated aluminum alloy before and after 7 d salt spray testing. Samples exposed to 7 d (168 h) of salt spray exposure (5 wt % NaCl at 35° C.). Bare aluminum, before (15A) and after (15B) salt spray exposure. Coated aluminum alloy panels with $(BPEI_{20}/MMT_{20})_3$ before salt spray exposure are shown in FIG. 15C, FIGS. 15D-F show $(BPEI_{10}/MMT_{90})_v$ after salt spray exposure where v is 1 ml, 2 ml, or 3 ml sprayed on the substrate. FIGS. 15G-15I show (BPEI$_{50}$/MMT$_{50}$)$_v$ after salt spray exposure where v is 1 ml, 2 ml, or 3 ml sprayed on the substrate. FIGS. 15J-15L show (BPEI$_{20}$/MMT$_{80}$)$_v$ after salt spray exposure where v is 1 ml, 2 ml, or 3 ml sprayed on the substrate. Increased thickness (higher volume of the BPEI$_x$/MMT$_y$ mixture) improved the anticorrosion performance of the coating. The coating with 80 wt % MMT demonstrated superior corrosion inhibition especially where the coating remains intact, as compared to other samples investigated. The arrows indicate the location of the scribe.

FIG. 15C shows an example of the general appearance of a (BPEI$_x$/MMT$_y$)$_v$-coated aluminum alloy before exposure, where the surface is uniform with a white tinge, arising from the clay platelets. In one example, the 80 wt % MMT coating (FIGS. 15J-15L) provided commercially viable corrosion protection, as evidenced by the lessened occurrences of pitting and corrosion products. In some examples, increased corrosion inhibition was observed for "thicker" films where a higher volume of the BPEI$_x$/MMT$_y$ one-pot mixture (3 ml vs 1 ml) was employed. This is exemplified by FIG. 15L, where corrosion was observed mainly near the location of the scribe (red arrow).

Results from the salt spray test can be linked to the role of BPEI with regard to both the properties of the original solution-dispersion mixture and the integrity and anticorrosion properties of the (BPEI$_x$/MMT$_y$)$_v$ coatings. In one example, 20:80 BPEI/MMT mixture, where there is likely just enough BPEI to intercalate within the MMT clay, but not too much so as to compromise film quality. This 20:80 composition also lead to an increase in viscosity, which positively influenced atomization, substrate wetting and the overall corrosion protection performance of the (BPEI$_{20}$/MMT$_{80}$)$_v$ coatings.

Figures 16A, 16B, 16C, 16D, 16E, 16F:
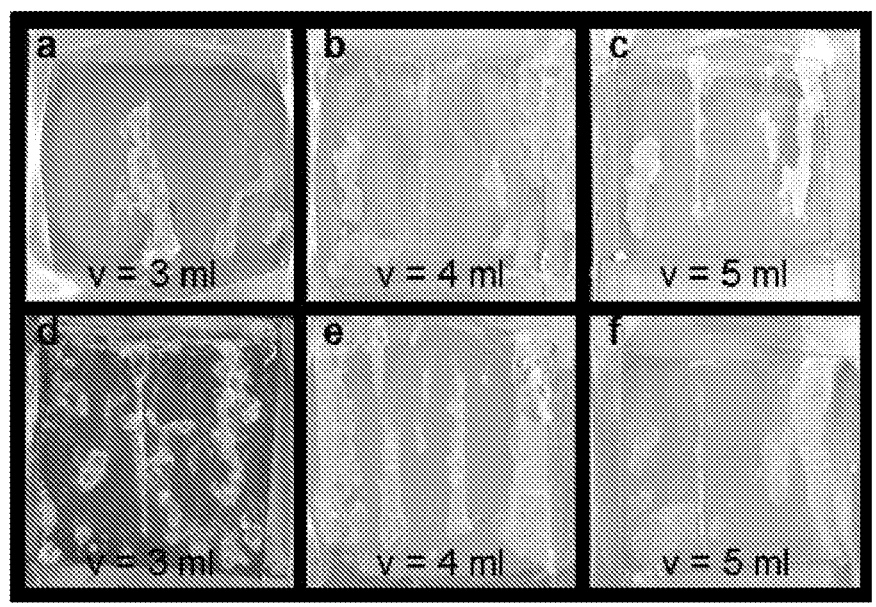
FIGS. 16A-16F illustrate images of substrates with coatings fabricated according to certain embodiments of the present disclosure after exposure to 7 d (168 h) of salt-spray testing (5 wt % NaCl at 35° C.)

Additional salt-spray testing results are illustrated in FIGS. 16A-16F. FIGS. 16A-16F illustrate samples with coatings fabricated according to certain embodiments of the present disclosure after exposure to 7 d (168 h) of salt-spray testing (5 wt % NaCl at 35° C.). In particular, the results of this salt-spray testing are shown in FIG. 16A for a (BPEI$_{20}$/MMT$_{80}$)$_3$ coating, FIG. 16B for a (BPEI$_{20}$/MMT$_{80}$)$_4$ coating, and FIG. 16C for a (BPEI$_{20}$/MMT$_{80}$)$_5$ coating. In addition, the results of this salt-spray testing are shown in FIG. 16D for a (BPEI$_{10}$/MMT$_{90}$)$_3$ coating, FIG. 16E for a (BPEI$_{10}$/MMT$_{90}$)$_4$ coating, and FIG. 16F for a (BPEI$_{10}$/MMT$_{90}$)$_5$ coating. Enhanced corrosion resistance is observed for 90 wt % MMT coatings when v≥4 ml.

Figure 17B:
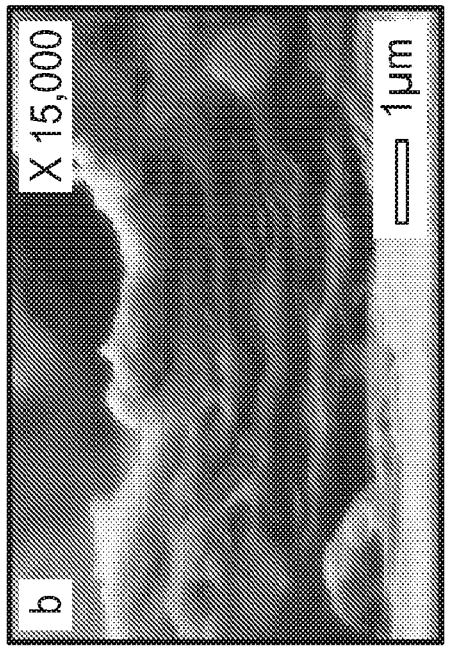
FIGS. 17A-17D are scanning electron microscopy (SEM) images of the 20:80 BPEI/MMT coatings discussed herein.
Figure 17D:
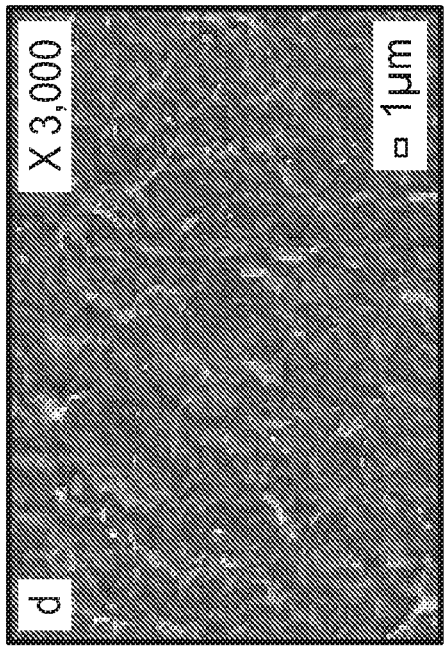
Figure 17A:
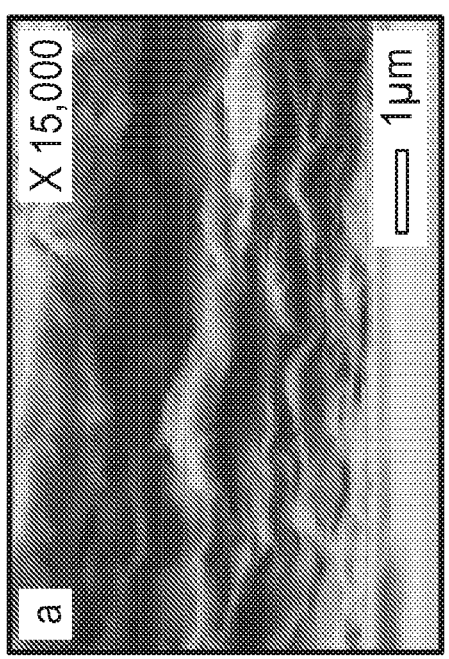
Figure 17C:
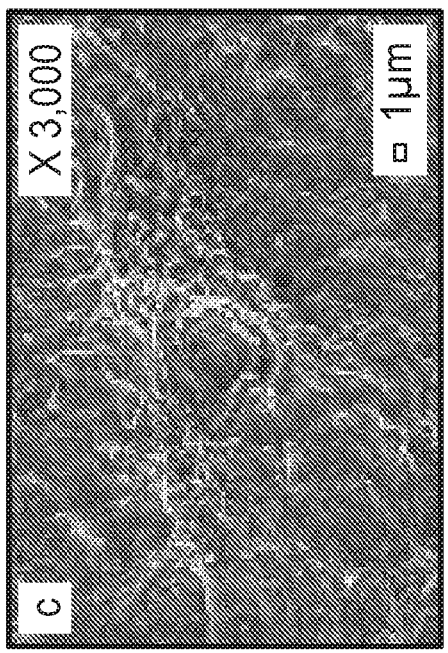

FIGS. 17A-17D are scanning electron microscopy (SEM) images of the 20:80 BPEI/MMT coatings discussed herein. In particular, FIG. 17A is a cross-sectional image of a coating made with BPEI Mw 2,000,000 g-mol$^{-1}$ and FIG. 17B is a cross-sectional image of a coating made with BPEI Mw 25,000 g-mol$^{-1}$. FIG. 17C shows an SEM surface image of a coating made with BPEI Mw 2,000,000 g-mol$^{-1}$ and FIG. 17D shows an SEM surface image of a coating made with BPEI Mw 25,000 g-mol$^{-1}$.

Figure 18A:
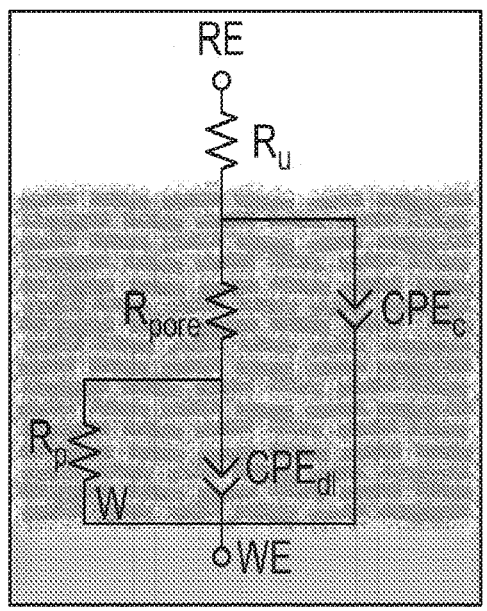
FIGS. 18A-18C are graphs of an equivalent circuit and fitted impedance data for an (BPEI$_{20}$/MMT$_{80}$)$_v$-coated aluminum alloy, with v=1, 2, and 3 ml coating thickness.
Figure 18B:
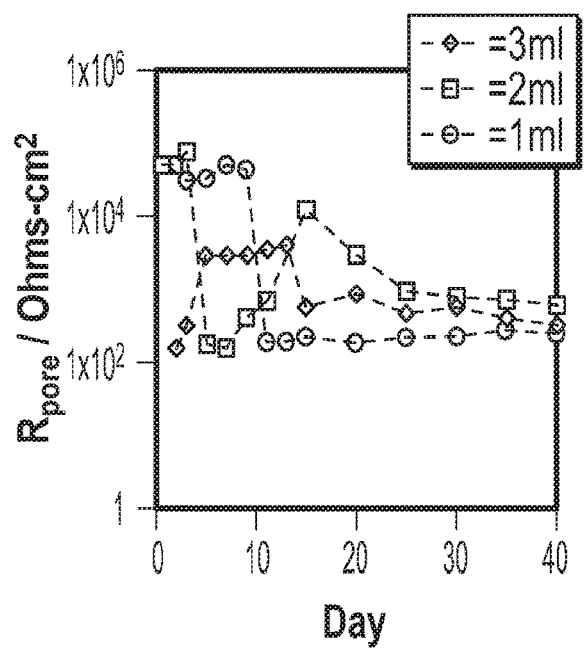
Figure 18C:
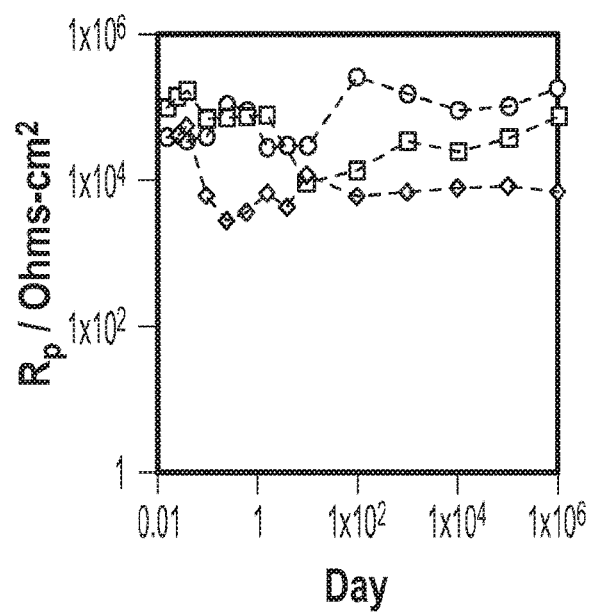

Electrochemical impedance spectroscopy (EIS) was used to evaluate the corrosion resistance of the bare and coated aluminum alloy when exposed to 5 wt % NaCl over 40 d. To assess the effect of coating thickness on the corrosion resistance, aluminum alloy coupons were coated with (BPEI$_{20}$/MMT$_{80}$)$_v$ where v=1, 2 and 3 ml, with a corresponding thickness of 490, 884, and 1859 nm, respectively. FIGS. 18A-18C are graphs of an equivalent circuit and fitted impedance data for an (BPEI$_{20}$/MMT$_{80}$)$_v$-coated aluminum alloy, with v=1, 2, and 3 ml coating thicknesses. FIG. 18A shows the equivalent circuit used for data fitting, where $R_u$, $R_{pore}$, and $R_p$ correspond to the resistances of the electrolyte ($R_u$), the coating ($R_{pore}$), and the charge transfer or polarization ($R_p$). $CPE_c$ and $CPE_{dl}$ are the capacitances of the coating and the double layer, respectively. W: Warburg element. FIG. 18B shows the $R_{pore}$ and FIG. 18C shows $R_p$ behaviors with time. A Warburg element (W) was used to model the diffusion of corrosive agents or corrosion products through the coating. In some embodiments, a desired range of impedance values in a coated substrate are values from $10^5$-$10^9$ Ohms-cm$^2$. This EIS data analysis was performed by fitting the data to an equivalent circuit shown in FIG. 18A. At later times and when a distinct diffusion tail was observed at low frequency, a Warburg element (W) was used to model the diffusion of corrosive agents or corrosion products through the coating. FIG. 18B presents the behavior of the pore resistance over a 40 d period. The (BPEI$_{20}$/MMT$_{80}$)$_v$ coating made with v=3 ml shows the most stable behavior up to day 9. On day 10, a decrease in pore resistance from 44×10$^3$ ohms-cm$^2$ to around 190 ohms-cm$^2$ occurred due to the diffusion of corrosive agents through the coating. After day 10, $R_{pore}$ stabilized around 220 ohms-cm$^2$, indicating the onset of a self-healing cycle. FIG. 18C shows the behavior of the polarization resistance, which indicates the resistance of the aluminum alloy to corrosion. $R_p$ values for the (BPEI$_{20}$/MMT$_{80}$)$_3$-coated aluminum alloy indicate a higher resistance to corrosion when compared to other samples (v=1 and 2 ml). Even after 20 d of salt exposure, $R_p$ values for the (BPEI$_{20}$/MMT$_{80}$)$_3$-coated aluminum alloy remain stable around 1.5×10$^5$ ohms-cm$^2$. In regards to the other (BPEI$_{20}$/MMT$_{80}$)$_v$-coated aluminum alloy samples with v=1 and 2 ml, $R_{pore}$ and $R_p$ values oscillate throughout the 40 d period, probably due to the formation and dissolution of corrosion products.

Figure 19A:
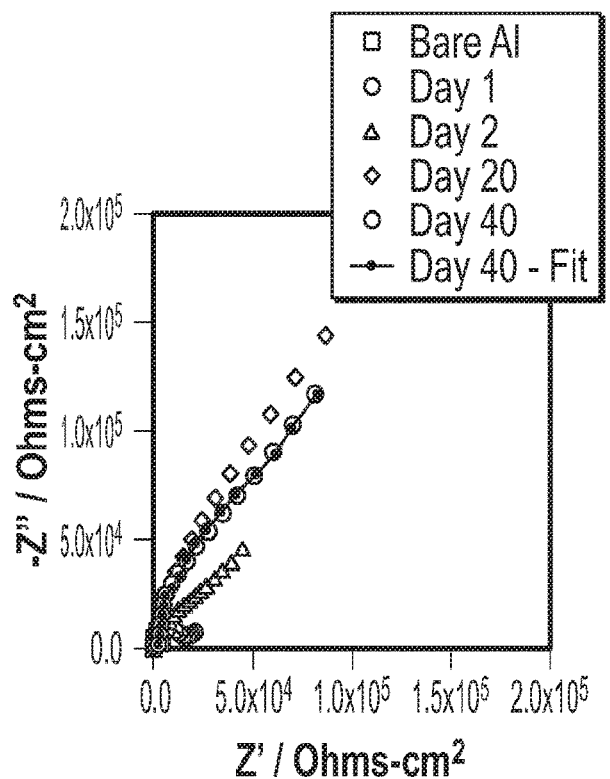
FIGS. 19A-19C presents Nyquist (FIG. 19A), Bode (FIG. 19B), and phase angle (FIG. 19C) plots for the (BPEI$_{20}$/MMT$_{80}$)$_3$-coated aluminum alloy sample over the course of 40 d.
Figure 19B:
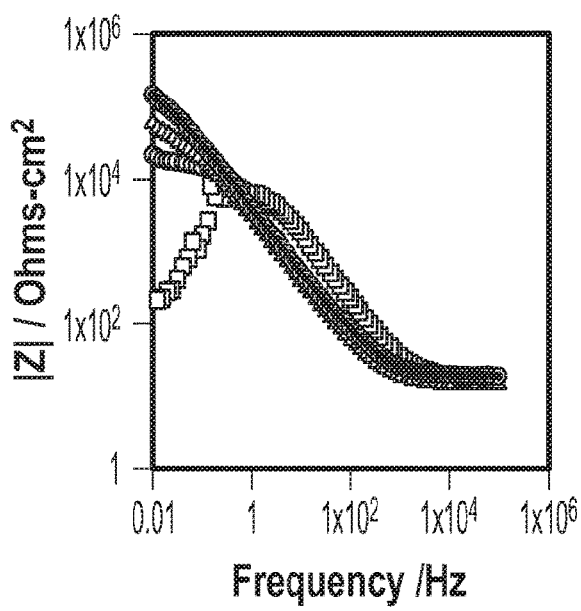
Figure 19C:
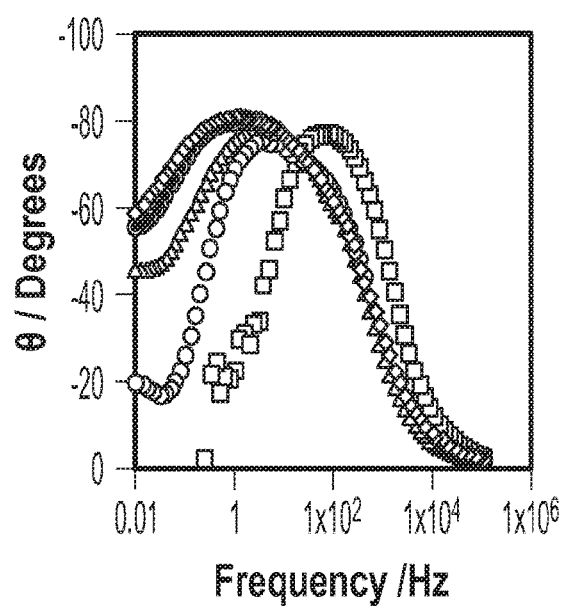

FIGS. 19A-19C presents Nyquist (FIG. 19A), Bode (FIG. 19B), and phase angle (FIG. 19C) plots for the (BPEI$_{20}$/MMT$_{80}$)$_3$-coated aluminum alloy sample over the course of 40 d. FIG. 19A shows an increase in the diameter of the impedance arc with exposure time, indicating an improvement in corrosion resistance. FIG. 19B presents the behavior of the total impedance (|Z|) as a function of frequency. |Z| values at a frequency of 0.01 Hz, initially at 22×10$^3$ ohms-cm$^2$ on day 1, stabilized after day 20 at 150×10$^3$ ohms-cm$^2$, indicating improved corrosion protection capabilities of the coating. It is worth noting that after 40 d of salt-exposure the impedance at 0.01 Hz (142×10$^3$ ohms-cm$^2$) was 730 times higher than that of the bare aluminum alloy (194 ohms-cm$^2$) on day one. FIG. 19C shows a phase angle—frequency plot, where a broad peak in the 0.1-1000 Hz frequency range can be divided in two time constants. These two time constants correspond to the coating's pore resistance and charge transfer polarization at the coating/substrate interface.

Figure 20A:
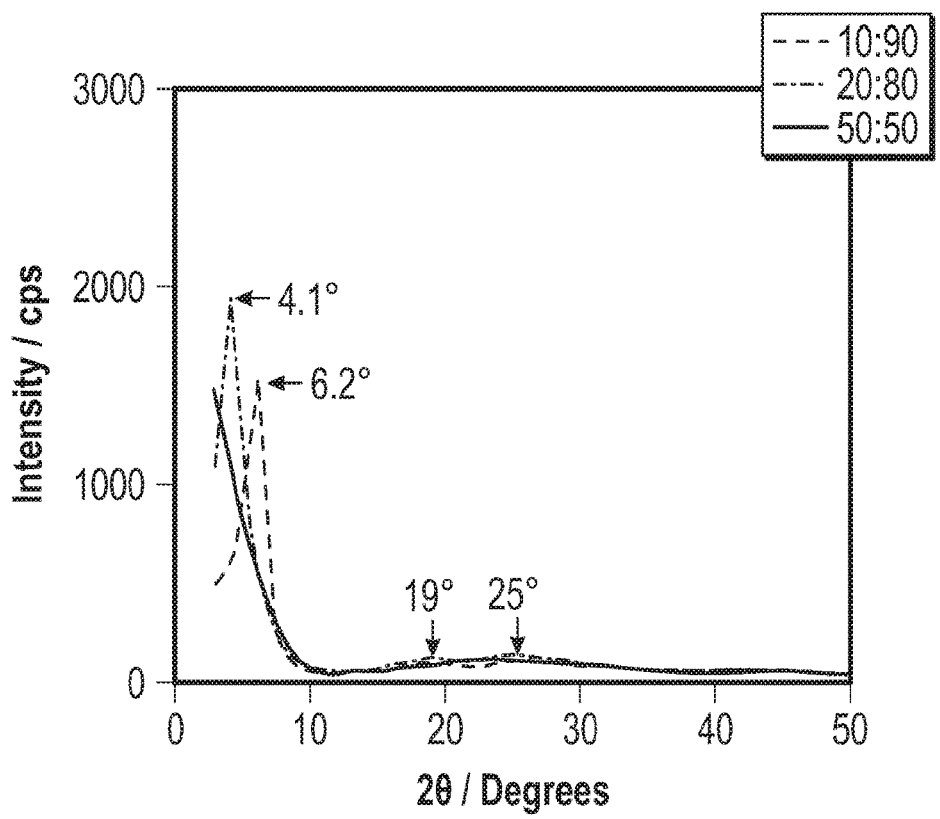
FIG. 20A is a 2-theta pattern for pretreatment coatings fabricated according to certain embodiments of the present disclosure.
Figure 20B:
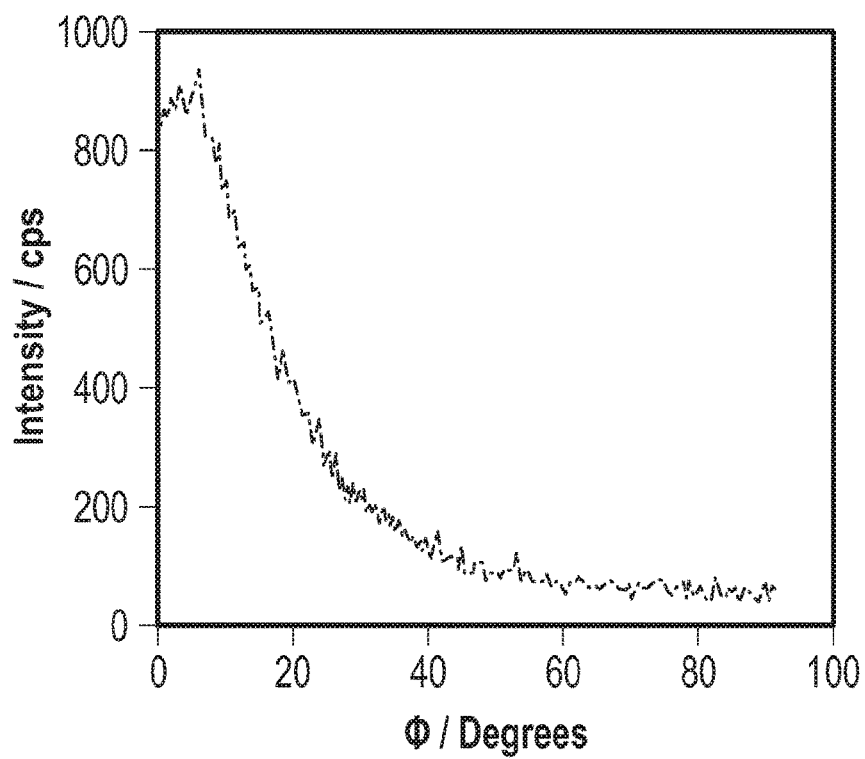
FIG. 20B shows the clay platelet orientation was evaluated employing WAXD with tilt where 2θ was fixed at 6.2° for the BPEI$_{20}$/MMT$_{80}$ composition for pretreatment coatings fabricated according to certain embodiments of the present disclosure.

(BPEI$_x$/MMT$_y$)$_v$ Coatings—Effect of Polymer-Clay Ratio on Structure: Orientation of MMT Clay Platelets in the Polymer Matrix:

A balance of BPEI and MMT was found to positively impact the corrosion protection properties of the polymer-clay coatings. The extent of polymer intercalation within the clay platelets was assessed through the interlayer spacing via wide angle X-ray diffraction (WAXD). The interlayer spacings are distances between clay platelets as measured in a direction perpendicular to the substrate. FIG. 20A is a 2θ pattern graph, where the peak at small 2θ values represents the basal spacing which describes the platelet-to-platelet stacking distance. Considering the basal spacing for natural MMT ($d_{001}$~1 nm), the interlayer spacings (discussed above 14A-14C) for the three compositions were 0.42 nm, 1.15 nm and >1.94 nm for $BPEI_{10}/MMT_{90}$, $BPEI_{20}/MMT_{80}$ and $BPEI_{50}/MMT_{50}$, respectively. This shows that, in some embodiments, the interlaying spacing increases as the BPEI content increases. The $BPEI_{50}/MMT_{50}$ composition presented an interlayer spacing greater than 1.94 nm, where the excess of polymer promoted both polymer intercalation and further exfoliation of the clay platelets. The $BPEI_{20}/MMT_{80}$ composition showed an intermediate interlayer spacing of 1.15 nm, consistent with the trend in composition. Results from interlayer spacing as a function of $BPEI_x/MMT_y$ composition align with the analysis of corrosion protection performance for FIGS. 15A-15L. FIG. 20B shows the clay platelet orientation evaluated employing WAXD with tilt where 2θ was fixed at 6.2° for the $BPEI_{20}/MMT_{80}$ composition. The maximum intensity was observed at a tilt angle of φ=6°, suggesting a mostly parallel orientation of the clay platelets with respect to the substrate. This finding is additionally supported by a calculated Herman's orientation parameter of f=0.34, which allows the quantification of the clay platelet alignment within the film with reference to the substrate. f values range from −0.5 to 1, where values of −0.5, 0, and 1 indicate perpendicular, random, and parallel orientation, respectively. This shows that the sprayed BPEI/MMT coatings have a tunable interlayer spacing with platelets oriented parallel to the substrate surface. In some embodiments, substantially all platelets are oriented substantially parallel to the substrate, where "substantially" means that the coating performs functionally as if 100% of the platelets are oriented parallel to the surface. In alternate embodiments, greater than 50%, 75%, or 95% of the platelets of an entire pretreatment coating (regardless of the number of compositions or layers) are substantially parallel to the substrate.

$(BPEI_{20}/MMT_{80})_3$ Coating—Structure—

Figure 21A:
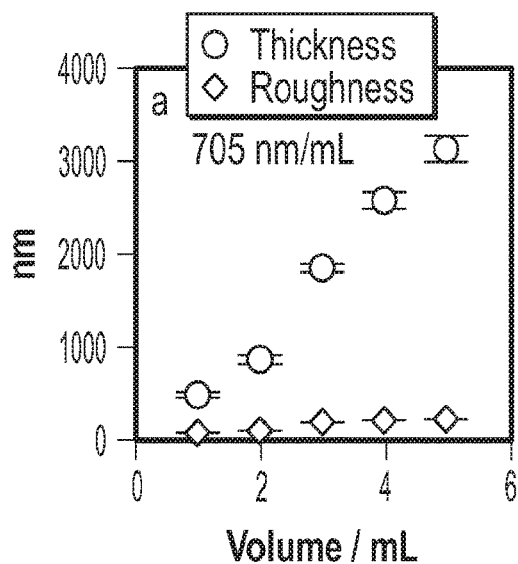
FIG. 21A is a chart showing the thickness of the (BPEI$_{20}$/MMT$_{80}$)$_v$ coatings (as a function of the one-pot mixture volume) applied to silicon wafers.
Figure 21B:
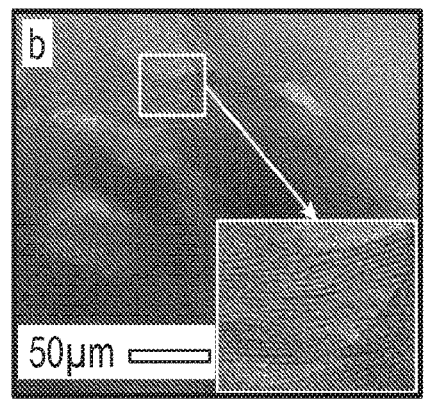
FIG. 21B is a TEM image of a cross-section of the (BPEI$_{20}$/MMT$_{80}$)$_v$ coating.
Figure 21C:
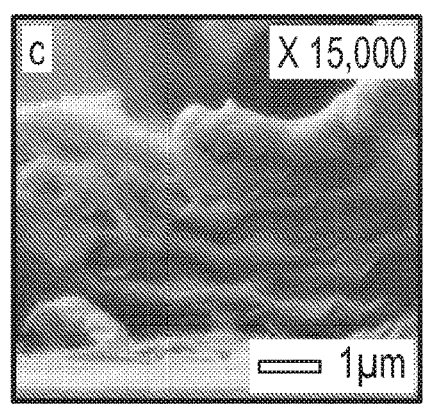
FIGS. 21C-D are SEM images of the (BPEI$_{20}$/MMT$_{80}$)$_v$ coating applied to Al2024.
Figure 21D:
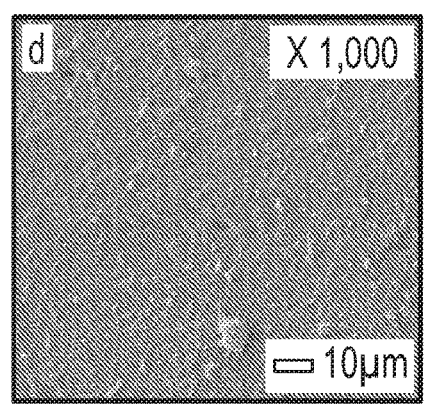

FIGS. 21A-21D shows structural results for $(BPEI_{20}/MMT_{80})_v$ coatings fabricated according to certain embodiments of the present disclosure. In particular, FIG. 21A shows a graph of the film thickness and roughness on a silicon wafer as a function of the volume of the one-pot mixture of $(BPEI_{20}/MMT_{80})$ sprayed at 30 psi. FIG. 21B shows a transmission electron microscopy (TEM) image and FIG. 21C shows a scanning electron microscopy (SEM) cross-sectional image of the coating of FIG. 21A, and FIG. 21D shows an SEM image of the as-prepared $(BPEI_{20}/MMT_{80})_3$ coating on an aluminum alloy coupon. In particular, FIG. 21A presents the thickness of the $(BPEI_{20}/MMT_{80})_v$ coating as a function of the one-pot mixture volume (v), measured using profilometry. A linear growth was exhibited, where the calculated thickness per milliliter (slope) is 705 nm·ml$^{-1}$. The $(BPEI_{20}/MMT_{80})_3$ film exhibited a root-mean-square (rms) roughness of 201 nm (around 11% of the film's total thickness). In some embodiments, a target roughness of 11% to about 20% of the total thickness of the film. The TEM image in FIG. 21B supports the intercalated structure of the $BPEI_{20}/MMT_{80}$ PCN, where the clay platelets appear as dark elongated particles. Similarly, the coating's multilayered structure is evidenced in FIG. 21C. FIG. 21D (surface SEM image) reveals the smooth surface of the successfully applied $(BPEI_{20}/MMT_{80})_3$ coating on aluminum alloy. The processing time for a 1859 nm thick $(BPEI_{20}/MMT_{80})_3$ film was of 15 minutes (124 nm·min$^{-1}$), ~40 times faster than films made via assembly methods such as layer-by-layer assembly (3 nm·min$^{-1}$).

$(BPEI_{20}/MMT_{80})_3$ Coating—Barrier Properties:

Barrier properties of the $(BPEI_{20}/MMT_{80})_3$ coating were examined by oxygen transmission rate (OTR) and oxygen permeability measurements at 0% relative humidity. The OTR for the PET (polyethylene terephthalate ST505) coated with $(BPEI_{20}/MMT_{80})_3$ was 0.047 cm$^3$·m$^{-2}$·d$^{-1}$·atm$^{-1}$, nearly 180 times less than the OTR for bare PET (8.6 cm$^3$·m$^{-2}$·d$^{-1}$·atm$^{-1}$). This data is consistent with data provided in the literature for BPEI/MMT LbL films containing ~80 wt % clay. The oxygen permeability of the $(BPEI_{20}/MMT_{80})_3$ film was decoupled from the PET substrate, and calculated to be 0.001×10$^{-16}$ cm$^3$ (STP) cm·cm$^{-2}$·s$^{-1}$·Pa$^{-1}$. The oxygen permeability of the $(BPEI_{20}/MMT_{80})_3$ film is 10-100-fold better than ethylene vinyl alcohol (EVOH), and even better than most materials used for packaging applications (polyvinyl alcohol, polyamide, etc).

Next, the Brasher-Kingsbury equation was used to calculate the coating water uptake by relying on values of the coating's capacitance measured at 0 and 24 h following the Rapid Electrochemical Assessment of Paint (REAP) procedure. The water uptake of the $(BPEI_{20}/MMT_{80})_3$ coating on the aluminum alloy was computed to be 39 v % water. Additionally, a goniometer was used to measure the advancing and receding angles, 38.4° and 27.5°, respectively. Contact angle measurements and the calculated coating water uptake indicate a fairly hydrophilic behavior of the $(BPEI_{20}/MMT_{80})_3$ coating. Interestingly, the $(BPEI_{20}/MMT_{80})_3$ coating's hydrophilicity did not seem to affect its good anticorrosion properties.

Figure 22A:
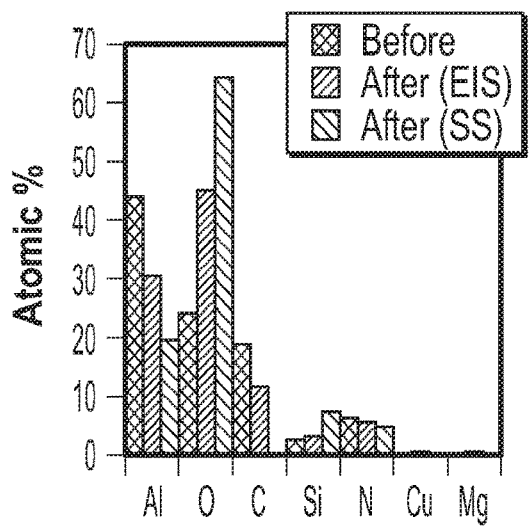
FIGS. 22A and 22B are energy dispersive spectroscopy (EDS) and X-ray photoelectron spectroscopy (XPS) graphs for aluminum panels coated with (BPEI$_{20}$/MMT$_{80}$)$_3$ coatings before and after corrosion tests.
Figure 22B:
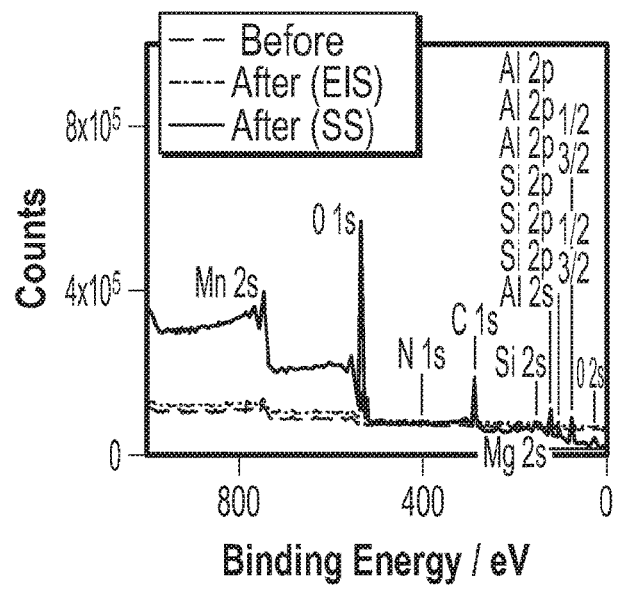

$(BPEI_{20}/MMT_{80})_3$ Coating—Elemental Analysis Before and after Corrosion Testing:

FIGS. 22A and 22B are energy dispersive spectroscopy (EDS) and X-ray photoelectron spectroscopy (XPS) graphs respectively. FIG. 22A shows an EDS graph that shows the atomic % of various elements and FIG. 22B is an XPS graph that shows energy counts across different energy bands that correspond to various elements. Elemental analysis before and after corrosion testing was performed to analyze the composition of the $(BPEI_{20}/MMT_{80})_3$-coated aluminum alloy samples, as shown in FIG. 22A. Three $(BPEI_{20}/MMT_{80})_3$-coated aluminum alloy samples were studied: 1) before corrosion tests, 2) after EIS measurements (50 d, 5 wt % NaCl), and 3) after salt spray testing (SS, 7 d, 5 wt % NaCl), as indicated in both FIGS. 22A and 22B. Detected elements with EDS correspond to the aluminum alloy/PCN coating system. These elements included aluminum, oxygen, carbon, silicon, nitrogen, copper, and magnesium. XPS data separately confirmed the elemental analysis obtained from EDS. Salt spray testing was expected to cause greater damage to the bare/coated metal, versus EIS measurements where the bare/coated metal was exposed to a stagnant salt solution. The oxygen content after salt spray testing is around 20 atomic % higher than for EIS measurements, with values of 65.03 atomic % and 45.65 atomic %, respectively, data which supports the aggressiveness of salt spray testing. After corrosion testing, lower aluminum content and higher oxygen content evidence the presence of corrosion products. These corrosion products provide further corrosion resistance through a plugging effect, where the corrosion products heal defects caused by corrosion, thus resisting and slowing down the corrosion process. This plugging effect is additionally supported by the resistance of the aluminum alloy to corrosion as discussed for FIG. 18C. Thus, due to at least the contributions of BPEI and MMT, together with the self-plugging effect of passivating corrosion products, a self-healing effect of the $(BPEI_{20}/MMT_{80})_3$-coated aluminum alloy system, is provided rendering overall long-term corrosion protection.

Exemplary embodiments are disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow, that scope including all equivalents of the subject matter of the claims.

1. A coating for protecting a metal substrate from corrosion, the coating comprising: a first composition applied on the metal substrate; and a second composition applied on the first composition, wherein the first composition is positioned between the second composition and the metal substrate; wherein the first composition includes a first layer directly applied on the metal substrate and a second layer directly applied on the first layer, wherein the first layer of the first composition is positioned between the second layer of the first composition and the metal substrate, and wherein the first layer of the first composition comprises positively charged polymers and the second layer comprises negatively charged polymers; wherein the second composition comprises positively charged polymers and negatively charged silicate clay.

2. The coating of any of the above claims, wherein the first composition further comprises a third layer directly applied on the second layer of the first composition and a fourth layer directly applied on the third layer of the first composition, wherein the third layer of the first composition is positioned between the second layer and the fourth layer of the first composition; wherein the third layer of the first composition comprises positively charged polymers and the fourth layer of the first composition comprises negatively charged polymers.

3. The coating of any of the above claims, wherein the positively charged polymers of the first layer of the first composition and the third layer of the first composition are selected from linear polyethylenimine (L-PEI), branched polyethylenimine (B-PEI), poly(diallyldimethylammonium chloride) (polyDDA), poly(allylamine hydrochloride), or combinations thereof, wherein the negatively charged polymers of the second layer of the first composition and the fourth layer of the first composition are selected from poly(acrylic acid) (PAA), poly(methacrylic acid) (PMAA), poly(styrene sulfonate) (PSS), or combinations thereof.

4. The coating of any of the above claims, wherein the positively charged polymers of the second composition are selected from branched polyethylenimine (B-PEI), linear polyethylenimine (L-PEI), poly(diallyldimethylammonium chloride) (polyDDA), poly(allylamine hydrochloride), or combinations thereof; and wherein the negatively charged silicate clay of the second composition is selected from montmorillonite (MMT), organo-modified MMT, laponite, vermiculite, or combinations thereof.

5. The coating of any of the above claims, wherein the positively charged polymers of the second composition and the negatively charged silicate clay of the second composition are homogeneously mixed in the second composition.

6. The coating of any of the above claims, wherein the coating has a total thickness Tt measured perpendicularly from the outer surface of the metal substrate to an outermost surface of the coating distal the metal substrate, wherein the total thickness Tt is at least 1.0 μm.

7. The coating of any of the above claims, wherein the positively charged polymers of the second composition and the negatively charged silicate clay of the second composition are arranged in alternating layers.

8. The coating of any of the above claims, wherein the second composition comprises an innermost layer immediately adjacent the first composition and an outermost layer distal the first composition, wherein the innermost layer and the outermost layer of the second composition both comprise the positively charged polymers.

9. The coating of any of the above claims, wherein the innermost layer and the outermost layer of the second composition both comprise branched polyethylenimine (B-PEI).

10. The coating of any of the above claims, the alternating layers comprise at least forty layer pairs of the positively charged polymers and the negatively charged silicate clay.

11. The coating of any of the above claims, wherein each pair of adjacent layers of the positively charged polymers of the second composition and the negatively charged silicate clay of the second composition has a layer pair thickness Tlp measured perpendicular to the outer surface of the metal substrate, wherein the layer pair thickness Tlp of each pair of adjacent layers of the positively charged polymers of the second composition and the negatively charged silicate clay is about 1.0 to 10.5 nm.

12. The coating of any of the above claims, wherein the coating has a total thickness Tt measured perpendicularly from the outer surface of the metal substrate to an outermost surface of the coating distal the metal substrate, wherein the total thickness Tt is at least 400 nm.

13. The coating of any of the above claims, wherein the metal substrate comprises aluminum or an aluminum alloy.

14. A coating for protecting a metal substrate from corrosion, the coating comprising: a polymer-clay nanocomposite composition attached to the metal substrate; wherein the polymer-clay nanocomposite composition comprises a plurality of alternating layers of positively charged polymers and negatively charged silicate clay; wherein an innermost layer of the polymer-clay nanocomposite composition proximal the metal substrate comprises the positively charged polymers and an outermost layer of the polymer-clay nanocomposite composition distal the metal substrate comprises the positively charged polymers.

15. The coating of any of the above claims, wherein the innermost layer and the outermost layer of the polymer-clay nanocomposite composition comprise branched polyethylenimine (B-PEI).

16. The coating of any of the above claims, wherein the alternating layers of the polymer-clay nanocomposite composition comprise at least forty layer pairs of the positively charged polymers and the negatively charged silicate clay.

17. The coating of any of the above claims, wherein each pair of adjacent layers of the positively charged polymers of the polymer-clay nanocomposite composition and the negatively charged silicate clay of the polymer-clay nanocomposite composition has a layer pair thickness Tlp measured perpendicular to an outer surface of the metal substrate, wherein the layer pair thickness Tlp of each pair of adjacent layers of the positively charged polymers of the polymer-clay nanocomposite composition and the negatively charged silicate clay of the polymer-clay nanocomposite composition is about 1.0 to 10.5 nm.

18. The coating of any of the above claims, wherein the layers of positively charged polymers comprise branched polyethylenimine (B-PEI), linear polyethylenimine (L-PEI), poly(diallyldimethylammonium chloride) (polyDDA), poly (allylamine hydrochloride), or combinations thereof; and wherein the layers of negatively charged silicate clay comprise montmorillonite (MMT), organo-modified MMT, laponite, vermiculite, or combinations thereof.

19. The coating of any of the above claims, wherein the coating has a total thickness Tt measured perpendicularly from the outer surface of the metal substrate to an outermost surface of the coating distal the metal substrate, wherein the total thickness Tt is at least 400 nm.

20. The coating of any of the above claims, wherein the metal substrate comprises aluminum or an aluminum alloy.

21. A method for applying a corrosion resistant coating to a metal substrate, the method comprising: disposing a first composition on a metal substrate by disposing at least one layer pair comprising a first aqueous solution and a second aqueous solution, the first aqueous solution comprising a positively-charged polymer and the second aqueous solution comprising a negatively charged polymer; disposing a plurality of layer pairs to form a second composition on the first composition, wherein each layer pair of the plurality of layer pairs of the second composition is formed by: disposing a third aqueous solution comprising a positively-charged polymer; drying the third aqueous solution; disposing a fourth aqueous solution comprising a negatively charged clay; drying the fourth aqueous solution.

22. The method of any of the above claims, further comprising disposing the second composition using layer-by-layer spray deposition from about 2θ psig to about 40 psig.

23. The method of any of the above claims, further disposing from 2 to 40 layer pairs to form the second composition.

24. The method of any of the above claims, further disposing at least 40 layer pairs to form the second composition.

25. The method of any of the above claims, further comprising disposing the first layer pair by:
disposing a layer of the first aqueous solution on the metal substrate, wherein the first aqueous solution comprises a cationic polymer comprising linear polyethylenimine (L-PEI), branched polyethylenimine (B-PEI), poly(diallyldimethylammonium chloride) (polyDDA), poly(allylamine hydrochloride), L-PEI, or combinations thereof; disposing a layer of the second aqueous solution on the layer of the first aqueous solution, the second aqueous solution comprising at least one anionic polymer comprising poly(acrylic acid) (PAA), poly(methacrylic acid) (PMAA), poly(styrene sulfonate) (PSS), PAA, or combinations thereof.

26. The method of any of the above claims, further comprising depositing the first composition to form a thickness from about 0.5 μm-to about 25 μm.

27. The method of any of the above claims, further comprising depositing each layer pair of the second composition to form a layer pair thickness from about 1.0 nm to about 10.5 nm.

28. The method of any of the above claims, further comprising drying the positively-charged polymer for 5 seconds to 70 seconds.

29. The method of any of the above claims, further comprising drying the negatively-charged clay for 5 seconds to 70 seconds.

30. The method of any of the above claims, further comprising disposing the third aqueous solution comprising a wt. % of the positively-charged polymer from about 0.05 to about 1.0 wt. %.

31. The method of any of the above claims, further comprising disposing the fourth aqueous solution comprising a pH from about 4 to about 10 and a wt. % of the negatively-charged clay from about 0.05 to about 2.0 wt. %.

32. The method of any of the above claims, wherein the positively charged polymers of the first aqueous solution and the third aqueous solution are selected from linear polyethylenimine (L-PEI), branched polyethylenimine (B-PEI), poly(diallyldimethylammonium chloride) (polyDDA), poly (allylamine hydrochloride), or combinations thereof.

33. The method of any of the above claims, wherein the negatively charged polymers of the second composition are selected from poly(acrylic acid) (PAA), poly(methacrylic acid) (PMAA), poly(styrene sulfonate) (PSS)), or combinations thereof.

What is claimed is:

1. A coating for protecting a substrate from corrosion, the coating comprising:
a first layer having a first composition applied on the substrate, wherein the coating has a thickness of at least 0.5 μm;
wherein the first composition comprises an intercalated mixture of a polymer and a clay, and wherein an interlayer spacing of a plurality of clay platelets of the clay is from about 0.50 nm to about 10 nm, and wherein greater than 50% of the plurality of clay platelets of the clay are oriented parallel to the substrate.

2. The coating of claim 1, wherein the polymer comprises one of polyethylenimine (B-PEI), linear polyethylenimine (L-PEI), poly(diallyldimethylammonium chloride) (polyDDA), poly(allylamine hydrochloride), poly(acrylic acid) (PAA), poly(methacrylic acid) (PMAA), poly(styrene sulfonate) (PSS), PAAMPSA (poly(2-acrylamido-2-methylpropane sulfonic acid), or combination thereof.

3. The coating of claim 1, wherein the clay comprises montmorillonite (MMT), organo-modified MMT, laponite, vermiculite, kaolinite, illite, chlorite, or talc.

4. The coating of claim 1, wherein the clay comprises a sheet silicate.

5. The coating of claim 1, wherein a volume of the first composition is from 1 milliliters (ml) to 10 ml.

6. The coating of claim 1, wherein a ratio of the polymer and the clay of the intercalated mixture is in accordance with a formula of $(P_x/C_{1-x})_v$, wherein v comprises a volume of the intercalated mixture applied to the substrate and x is from 0.1 to 0.5.

7. The coating of claim 6, wherein x is 0.2 and a volume of the first composition is at least 3 milliliters (ml).

8. The coating of claim 1, wherein an average first dimension of the plurality of clay platelets is from about 15 nm to about 3000 nm and an average second dimension of the plurality of clay platelets is from about 0.25 nm to about 3 nm.

9. The coating of claim 1, wherein a root mean square roughness of the coating is from about 1% to about 20% of a total coating thickness.

10. The coating of claim 1, wherein the intercalated mixture comprises a plurality of pairs of alternating positively charged polymer layers and negatively charged clay layers.

11. The coating of claim 1, wherein the intercalated mixture has a greater amount of clay by weight than polymer by weight.

12. The coating of claim 1, wherein at least 95% of the plurality of clay platelets of the clay are oriented parallel to the substrate.

13. The coating of claim 1, wherein:
the first composition comprises an outer composition comprising a first plurality of pairs of alternating positively and negatively charged polymer layers; and
the coating further comprises an inner composition sandwiched between the outer composition and the substrate, wherein the inner composition comprises a second plurality of pairs of alternating positively charged polymer layers and negatively charged clay layers.

\* \* \* \* \*